United States Patent
MacAdam et al.

(10) Patent No.: US 11,350,494 B2
(45) Date of Patent: *May 31, 2022

(54) LOAD CONTROL DEVICE FOR HIGH-EFFICIENCY LOADS

(71) Applicant: Lutron Technology Company LLC, Coopersburg, PA (US)

(72) Inventors: Russell L. MacAdam, Coopersburg, PA (US); Joseph T. Parent, Bethlehem, PA (US); Russell Weightman, Abington, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/086,915

(22) Filed: Nov. 2, 2020

(65) Prior Publication Data

US 2021/0051777 A1 Feb. 18, 2021

Related U.S. Application Data

(63) Continuation of application No. 16/252,776, filed on Jan. 21, 2019, now Pat. No. 10,827,571, which is a
(Continued)

(51) Int. Cl.
| | |
|---|---|
| *H05B 45/10* | (2020.01) |
| *H05B 45/31* | (2020.01) |
| *H05B 45/3575* | (2020.01) |
| *H05B 45/38* | (2020.01) |
| *H05B 45/50* | (2022.01) |
| *H05B 39/04* | (2006.01) |

(Continued)

(52) U.S. Cl.
CPC .......... *H05B 39/044* (2013.01); *H05B 45/10* (2020.01); *H05B 45/31* (2020.01);
(Continued)

(58) Field of Classification Search
CPC ............ H05B 33/0815; H05B 33/0842; H05B 33/0845; H05B 39/04; H05B 39/041;
(Continued)

(56) References Cited

U.S. PATENT DOCUMENTS

| | | | |
|---|---|---|---|
| 4,870,340 A | 9/1989 | Kral | |
| 5,004,969 A | 4/1991 | Schanin | |

(Continued)

FOREIGN PATENT DOCUMENTS

| | | |
|---|---|---|
| EP | 2020830 A2 | 2/2009 |
| EP | 2443910 A1 | 4/2012 |

*Primary Examiner* — Jason Crawford
(74) *Attorney, Agent, or Firm* — Philip Smith; Glen Farbanish; Michael Czarnecki

(57) ABSTRACT

A load control device for controlling power delivered from an AC power source to an electrical load may comprise a thyristor, a gate current path, and a control circuit. The control circuit may be configured to control the gate current path to conduct a pulse of gate current through a gate terminal of the thyristor to render the thyristor conductive at a firing time during a half-cycle of the AC power source. The control circuit may operate in a first gate drive mode in which the control circuit renders the gate current path non-conductive after a pulse time period from the firing time. The control circuit may operate in a second gate drive mode in which the control circuit maintains the gate current path conductive after the pulse time period during the half-cycle.

20 Claims, 11 Drawing Sheets

Related U.S. Application Data continuation of application No. 15/256,184, filed on Sep. 2, 2016, now Pat. No. 10,187,944.

(60) Provisional application No. 62/214,616, filed on Sep. 4, 2015.

(51) Int. Cl.
*H02M 5/257* (2006.01)
*H02M 1/00* (2006.01)

(52) U.S. Cl.
CPC ......... *H05B 45/3575* (2020.01); *H05B 45/38* (2020.01); *H02M 1/0006* (2021.05); *H02M 5/2576* (2013.01); *H05B 45/50* (2020.01)

(58) Field of Classification Search
CPC .... H05B 39/044; H05B 39/047; H05B 45/10; H05B 45/31; H05B 45/3575; H05B 45/38
See application file for complete search history.

(56) References Cited

U.S. PATENT DOCUMENTS

| | | |
|---|---|---|
| 5,239,255 A | 8/1993 | Schanin et al. |
| 6,933,686 B1 | 8/2005 | Bishel |
| 7,480,128 B2 | 1/2009 | Black |
| 8,664,881 B2 | 3/2014 | Newman, Jr. et al. |
| 8,698,408 B2 | 4/2014 | Newman, Jr. |
| 8,729,814 B2 | 5/2014 | Salvestrini |
| 8,892,913 B2 | 11/2014 | Newman, Jr. et al. |
| 8,957,662 B2 | 2/2015 | Newman, Jr. et al. |
| 8,963,440 B2 | 2/2015 | Jennings et al. |
| 8,988,050 B2 | 3/2015 | Newman, Jr. et al. |
| 9,160,224 B2 | 10/2015 | Newman, Jr. et al. |
| 10,187,944 B2 * | 1/2019 | MacAdam ............. H05B 45/38 |
| 10,827,571 B2 * | 11/2020 | MacAdam ........... H05B 39/044 |
| 2004/0183474 A1 | 9/2004 | Moisin |
| 2006/0255745 A1 | 11/2006 | DeJonge et al. |
| 2009/0200952 A1 | 8/2009 | King |
| 2012/0230073 A1 | 9/2012 | Newman, Jr. et al. |
| 2013/0057169 A1 | 3/2013 | Harel |
| 2013/0170263 A1 | 7/2013 | Newman, Jr. et al. |
| 2013/0257406 A1 | 10/2013 | Hausman, Jr. et al. |
| 2014/0077718 A1 | 3/2014 | Zotter et al. |
| 2014/0126261 A1 | 5/2014 | Newman, Jr. et al. |
| 2014/0239842 A1 | 8/2014 | Salvestrini |
| 2015/0108913 A1 | 4/2015 | Newman, Jr. et al. |
| 2015/0137692 A1 | 5/2015 | Newman, Jr. et al. |
| 2015/0146465 A1 | 5/2015 | Newman, Jr. et al. |
| 2015/0381068 A1 | 12/2015 | Newman, Jr. et al. |

* cited by examiner

LOAD CONTROL DEVICE FOR HIGH-EFFICIENCY LOADS

CROSS-REFERENCE TO RELATED APPLICATIONS

This application is a continuation of U.S. patent application Ser. No. 16/252,776, filed on Jan. 21, 2019, which is a continuation of U.S. patent application Ser. No. 15/256,184, filed Sep. 2, 2016, now U.S. Pat. No. 10,187,994, issued on Jan. 22, 2019, which claims the benefit of U.S. Provisional Application No. 62/214,616, filed Sep. 4, 2015, both of which are incorporated herein by reference in their entirety.

BACKGROUND

The present invention relates to load control devices for controlling the amount of power delivered to an electrical load, and more particularly, to a dimmer switch for controlling the power delivered to a lighting load, such as a high-efficiency load.

Prior art two-wire load control devices, such as dimmer switches, are coupled in series electrical connection between an alternating-current (AC) power source and a lighting load for controlling the amount of power delivered from the AC power source to the lighting load. A two-wire wall-mounted dimmer switch is adapted to be mounted to a standard electrical wallbox and comprises two load terminals: a hot terminal adapted to be coupled to the hot side of the AC power source and a dimmed hot terminal adapted to be coupled to the lighting load. In other words, the two-wire dimmer switch does not require a connection to the neutral side of the AC power source (i.e., the load control device is a "two-wire" device). Prior art "three-way" dimmer switches may be used in three-way lighting systems and comprise at least three load terminals, but do not require a connection to the neutral side of the AC power source.

The dimmer switch may comprise a toggle actuator for turning the lighting load on and off and an intensity adjustment actuator for adjusting the intensity of the lighting load. Examples of prior art dimmer switches are described in greater detail is commonly-assigned U.S. Pat. No. 5,248,919, issued Sep. 28, 1993, entitled LIGHTING CONTROL DEVICE; U.S. Pat. No. 6,969,959, issued Nov. 29, 2005, entitled ELECTRONIC CONTROL SYSTEMS AND METHODS; and U.S. Pat. No. 7,687,940, issued Mar. 30, 2010, entitled DIMMER SWITCH FOR USE WITH LIGHTING CIRCUITS HAVING THREE-WAY SWITCHES, the entire disclosures of which are hereby incorporated by reference.

The dimmer switch typically comprises a bidirectional semiconductor switch, e.g., a thryristor (such as a triac) or two field-effect transistors (FETs) in anti-series connection. The bidirectional semiconductor switch is coupled in series between the AC power source and the load, and is controlled to be conductive and non-conductive for portions of a half cycle of the AC power source to thus control the amount of power delivered to the electrical load. Generally, dimmer switches use either a forward phase-control dimming technique or a reverse phase-control dimming technique in order to control when the bidirectional semiconductor switch is rendered conductive and non-conductive to thus control the power delivered to the load.

With forward phase-control dimming, the bidirectional semiconductor switch is rendered conductive at some point within each AC line voltage half cycle and remains conductive until approximately the next voltage zero-crossing, such that the bidirectional semiconductor switch is conductive for a conduction time each half cycle. A zero-crossing is defined as the time at which the AC line voltage transitions from positive to negative polarity, or from negative to positive polarity, at the beginning of each half cycle. Forward phase-control dimming is often used to control energy delivered to a resistive or inductive load, which may include, for example, an incandescent lamp or a magnetic low-voltage transformer. The bidirectional semiconductor switch of a forward phase-control dimmer switch may be implemented as a thyristor, such as a triac or two silicon-controlled rectifiers (SCRs) coupled in anti-parallel connection (e.g., since a thyristor becomes non-conductive when the magnitude of the current conducted through the thyristor decreases to approximately zero amps).

Many forward phase-control dimmers include analog control circuits (such as timing circuits) for controlling when the thyristor is rendered conductive each half cycle of the AC power source. The analog control circuit typically comprises a potentiometer, which may be adjusted in response to a user input provided from, for example, a linear slider control or a rotary knob in order to control the amount of power delivered to the lighting load. The analog control circuit is typically coupled in parallel with the thyristor and conducts a small timing current through the lighting load when the thyristor is non-conductive. The magnitude of the timing current is small enough such that the controlled lighting load is not illuminated to a level that is perceptible to the human eye when the lighting load is off.

Thyristors are typically characterized by a rated latching current and a rated holding current, and comprise two main load terminals and a control terminal (e.g., a gate). When the current conducted through the main terminals of the thyristor exceeds the latching current, the thyristor may become fully conductive. If the current conducted through the main terminals of the thyristor remain above the holding current, the thyristor may remain in full conduction. Since an incandescent lamp is a resistive lighting load, a typical forward phase-control dimmer switch is operable to conduct enough current through the incandescent lamp to exceed the rated latching and holding currents of the thyristor if the impedance of the incandescent lamp is low enough. Therefore, prior art forward phase-control dimmer switches are typically rated to operate appropriately with lighting loads having a power rating above a minimum power rating (e.g., approximately 40 W), such that the thyristor will be able to latch and remain latched when dimming the lighting load.

Some prior art dimmer switches have included two triacs coupled together to overcome some of the problems related to the rated latching and holding currents of triacs, e.g., as described in greater detail in commonly-assigned U.S. Pat. No. 4,954,768, issued Sep. 4, 1990, entitled TWO WIRE LOW VOLTAGE DIMMER. Such a prior art dimmer switch may comprise a first triac characterized by a low power rating and low latching and holding currents, and a second triac characterized by a high power rating and high latching and holding currents. The main load terminals of the first triac are coupled between one of the main load terminals and the gate of the second triac. In addition, a resistor is coupled between the other main load terminal and the gate of the second triac. If the magnitude of the load current is small, the first triac is rendered conductive when a pulse of current is conducted through the gate and remains latched until the magnitude of the load current drops below the holding current of the first triac (e.g., at the end of a half cycle). If the magnitude of the load current is large, the first triac conducts a pulse of the gate current through the gate of the second triac to render the second triac conductive and the second triac conducts the load current. Since the voltage across the first triac drops to approximately zero volts when the second triac is conductive, the first triac becomes non-conductive after the second triac is rendered conductive. The second triac remains conductive until the magnitude of the load current drops below the holding current of the second triac (e.g., at the end of a half cycle).

When using reverse phase-control dimming, the bidirectional semiconductor switch may be rendered conductive at the zero-crossing of the AC line voltage and rendered non-conductive at some point within each half cycle of the AC line voltage, such that the bidirectional semiconductor switch is conductive for a conduction time each half cycle. Reverse phase-control dimming may be used to control energy to a capacitive load, which may include, for example, an electronic low-voltage transformer. Since the bidirectional semiconductor switch may be rendered conductive at the beginning of the half cycle, and may be able to be rendered non-conductive within the half cycle, the dimmer switch may comprise two FETs in anti-serial connection (or the like) in order to perform reverse phase-control dimming. A FET is operable to be rendered conductive and to remain conductive independent of the magnitude of the current conducted through the FET. In other words, a FET is not limited by a rated latching or holding current (e.g., as a thyristor may be). However, prior art reverse phase-control dimmer switches have either required neutral connections and/or advanced control circuits (such as microprocessors) for controlling the operation of the FETs. In order to power a microprocessor, the dimmer switch must also comprise a power supply, which is typically coupled in parallel with the FETs. These advanced control circuits and power supplies add to the cost of prior art FET-based reverse phase-control dimmer switches (e.g., as compared to analog forward phase-control dimmer switches).

Further, in order to properly charge, the power supply of such a two-wire dimmer switch may develop an amount of voltage across the power supply and may conduct a charging current from the AC power source through the electrical load, in many instances even when the lighting load is off. If the power rating of the lighting load is too low, the charging current conducted by the power supply through the lighting load may be great enough to cause the lighting load to illuminate to a level that is perceptible to the human eye when the lighting load is off. Therefore, prior art FET-based reverse phase-control dimmer switches are typically rated to operate appropriately with lighting loads having a power rating above a minimum power rating, such that the lighting load does not illuminate to a level that is perceptible to the human eye (e.g., due to the power supply current when the lighting load is off). Some prior art load control devices have included power supplies that only develop small voltages and draw small currents when charging, such that the minimum power rating of a controlling lighting load may be as low as ten Watts. An example of such a power supply is described in greater detail in commonly-assigned U.S. patent application Ser. No. 12/751,324, filed Mar. 31, 2010, entitled SMART ELECTRONIC SWITCH FOR LOW-POWER LOADS, the entire disclosure of which is hereby incorporated by reference.

Nevertheless, it is desirable to be able to control the amount of power delivered to electrical loads having different characteristics (e.g., having power rating lower than those able to be controlled by the prior art forward and reverse phase-control dimmer switches). For instance, in order to save energy, high-efficiency lighting loads, such as compact fluorescent lamps (CFLs) and light-emitting diode (LED) light sources, are being used in place of or as replacements for conventional incandescent or halogen lamps. High-efficiency light sources typically consume less power and provide longer operational lives as compared to incandescent and halogen lamps. A load regulation device (e.g., such as an electronic dimming ballast or an LED driver) may be coupled between the AC power source and the respective high-efficiency light source (e.g., the compact fluorescent lamp or the LED light source) for regulating the power supplied to the high-efficiency light source.

A dimmer switch controlling a high-efficiency light source may be coupled in series between the AC power source and the load control device for the high-efficiency light source. Some high-efficiency lighting loads may be integrally housed with the load regulation devices, e.g., in a single enclosure. Such an enclosure may have a screw-in base that allows for mechanical attachment to standard Edison sockets. The enclosure may provide electrical connections to the neutral side of the AC power source, and either the hot side of the AC power source or the dimmed-hot terminal of the dimmer switch (e.g., for receipt of the phase-control voltage). The load regulation circuit is operable to control the intensity of the high-efficiency light source to the desired intensity (e.g., in response to the conduction time of the bidirectional semiconductor switch of the dimmer switch).

The load regulation devices for the high-efficiency light sources may have high input impedances or input impedances that vary in magnitude throughout a half cycle. Therefore, when a prior-art forward phase-control dimmer switch is coupled between the AC power source and the load regulation device for the high-efficiency light source, the load control device may not be able to conduct enough current to exceed the rated latching and/or holding currents of the thyristor. When a prior-art reverse phase-control dimmer switch is coupled between the AC power source and the load regulation device, the magnitude of the charging current of the power supply may be great enough to cause the load regulation device to illuminate the controlled high-efficiency light source to a level that is perceptible by the human eye when the light source should be off.

The impedance characteristics of the load regulation device may negatively affect the magnitude of the phase-control voltage received by the load regulation device, such that the conduction time of the received phase-control voltage is different from the actual conduction time of the bidirectional semiconductor switch of the dimmer switch (e.g., if the load regulation device has a capacitive impedance). Therefore, the load regulation device may control the intensity of the high-efficiency light source to an intensity that is different than the desired intensity as directed by the dimmer switch. In addition, the charging current of the power supply of the dimmer switch may build up charge at the input of a load regulation device having a capacitive input impedance, thus negatively affecting the low-end intensity that may be achieved.

SUMMARY

As described herein, a load control device for controlling power delivered from an AC power source to an electrical load may comprise a thyristor adapted to be electrically coupled between the AC power source and the electrical load. The thyristor may include a first main terminal, a second main terminal, and a gate terminal. The first and second main terminals may be configured to conduct a load current to energize the electrical load. The gate terminal may be configured to conduct a gate current to render the thyristor conductive. The load control device may further comprise a gate current path connected to the gate terminal of the thyristor. The gate current path may include a gate coupling circuit configured to conduct gate current through the gate terminal of the thyristor. The load control device may further comprise a control circuit electrically coupled to control the gate coupling circuit. The control circuit may be configured to control the gate current path to conduct, at a firing time of a half-cycle of the AC power source, a pulse of the gate current through the gate terminal of the thyristor to render the thyristor conductive.

The control circuit may be configured to operate in a first gate drive mode and a second gate drive mode. During the first gate drive mode, the control circuit may render the gate current path non-conductive after the pulse time period during the half-cycle of the AC power source. During the second gate drive mode, the control circuit may maintain the gate current path conductive after the pulse time period to allow at least one other pulse of current to be conducted through the gate terminal of the thyristor after the pulse time period during the half-cycle.

The control circuit may be configured to operate in the first gate drive mode while turning on the electrical load and to operate in the second gate drive mode once the electrical load is in a steady state condition. For example, the control circuit may be configured to operate in the first gate drive mode over a first plurality of half-cycles of the AC power source during which the electrical load is being turned on. The control circuit may then switch to the second gate drive mode when the electrical load enters a steady state and may stay in the second gate drive mode over a second plurality of half-cycles of the AC power source. During the first plurality of half-cycles, the control circuit may adjust the pulse time period from a minimum pulse time period to a maximum pulse time period. During the second plurality of half-cycles, the control circuit may maintain the gate current path conductive for the maximum pulse time period. The value of the maximum pulse time period may be dependent upon the firing time of the second gate drive mode.

The control circuit may be configured to operate in the second gate drive mode while turning on the electrical load, detect a fault condition while turning on the electrical load using the second gate drive mode, switch to the first gate drive mode to turn on the electrical load, and operate in the second gate drive mode after the electrical load enters a steady state.

As described herein, the load control device may further comprise a zero-crossing detection circuit configured to generate a zero-cross signal at the zero-crossing of the AC power source. The control circuit may be configured to control the conductivity of the gate current path based on the zero-cross signal. For example, the control circuit may be configured to sample the zero-cross signal during a zero-cross window, and determine if the zero-cross signal indicated the zero-crossing of the AC power source. Based on a determination that there was a zero-crossing of the AC power source, the control circuit may control the gate current path to conduct the pulse of gate current through the gate terminal of the thyristor to render the thyristor conductive at the firing time of the present half-cycle.

As described herein, a method may be provided for turning on an electrical load through a load control device. The load control device may comprise a thyristor having first and second main terminals through which a load current from an AC power source can be conducted to energize the electrical load and a gate terminal through which a gate current can be conducted to render the thyristor conductive. The method may comprise applying a first one of a plurality of start-up routines via the load control device to turn on the electrical load. At least one of the plurality of start-up routines may comprise causing the load control device to conduct the gate current through the gate terminal of the thyristor for only a pulse time period during a half-cycle of the AC power source. At least another one of the plurality of start-up routines may comprise causing the load control device to conduct the gate current through the gate terminal of the thyristor for more than the pulse time period during the half-cycle of the AC power source.

The method may further comprise determining whether a fault condition has occurred in the electrical load while applying the first one of the plurality of start-up routines. Based on a determination that a fault condition has occurred in the electrical load in response to the first one of the plurality of start-up routines, the method may further comprise applying a second one of the plurality of start-up routines via the load control device to turn on the electrical load. Based on a determination that a fault condition has not occurred in the electrical load in response to the first one of the plurality of start-up routines, the method may further comprise storing the first one of the plurality of start-up routines in a memory location of the load control device.

DETAILED DESCRIPTION OF THE INVENTION

Figure 1:
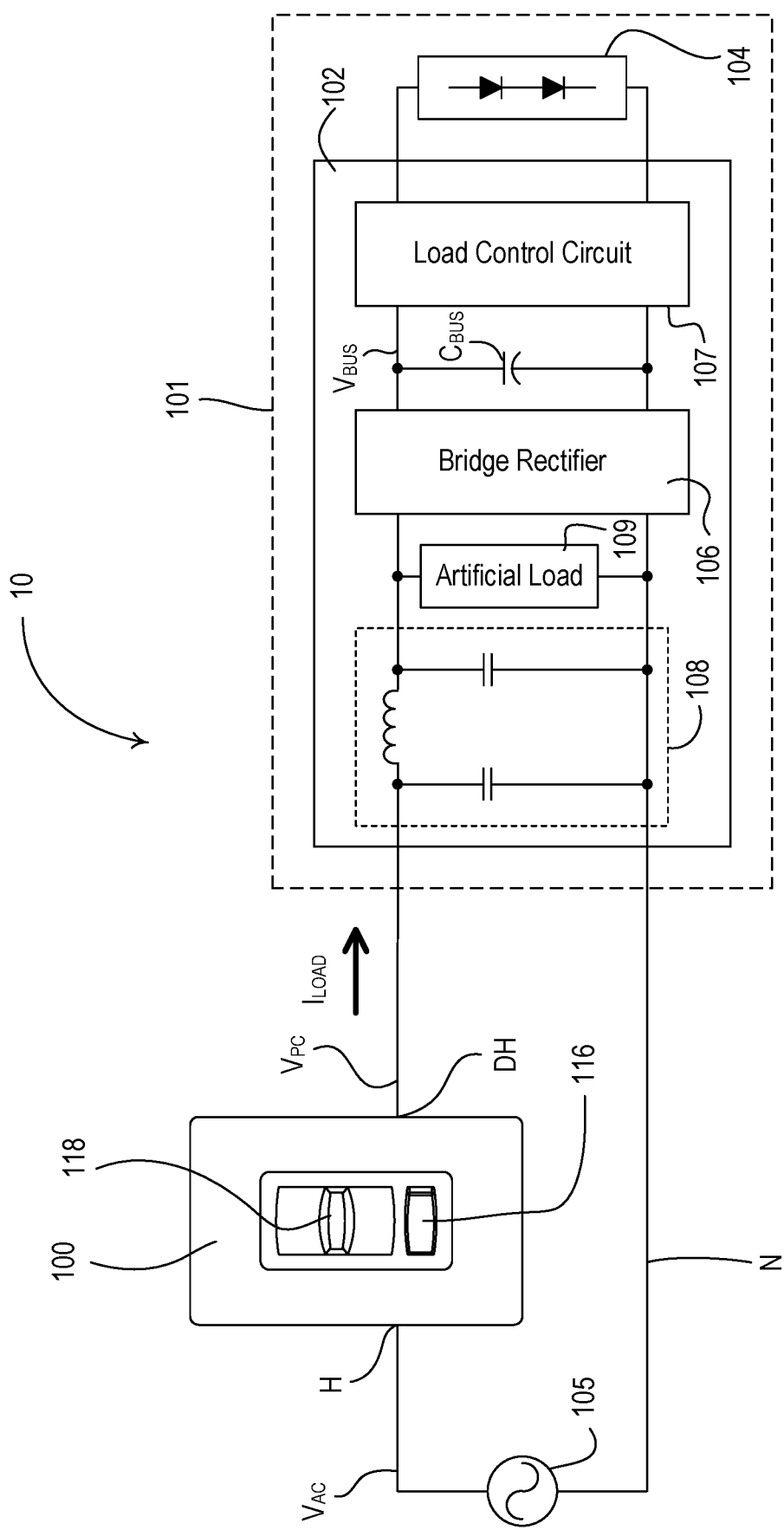
FIG. 1 is a simplified block diagram of an example lighting control system including a load control device (e.g., a "two-wire" dimmer switch) for controlling the intensity of a high-efficiency lighting load (e.g., an LED light source).

FIG. 1 is a simplified block diagram of an example lighting control system 10 including a load control device, e.g., "two-wire" dimmer switch 100, for controlling the amount of power delivered to a high-efficiency lighting load 101. The lighting load 101 may comprise a load regulation device, e.g., a light-emitting diode (LED) driver 102, and a high-efficiency light source, e.g., an LED light source 104 (or "light engine"). The dimmer switch 100 may have a hot terminal H coupled to an alternating-current (AC) power source 105 for receiving an AC mains line voltage $V_{AC}$, and a dimmed-hot terminal DH coupled to the LED driver 102. The dimmer switch 100 may not require a direct connection to the neutral side N of the AC power source 105. The dimmer switch 100 may generate a phase-control voltage $V_{PC}$ (e.g., a dimmed-hot voltage) at the dimmed-hot terminal DH and conduct a load current $I_{LOAD}$ through the LED driver 102. The dimmer switch 100 may use various phase-control dimming techniques (e.g., such as forward phase-control dimming or reverse phase-control dimming techniques) to generate the phase-control voltage $V_{PC}$.

As defined herein, a "two-wire" dimmer switch or load control device may not require a direct connection to the neutral side N of the AC power source 105. Currents conducted by the two-wire dimmer switch may be conducted through the load. A two-wire dimmer switch may include two terminals (e.g., the hot terminal H and the dimmed hot terminal DH as shown in FIG. 1). Alternatively, a two-wire dimmer switch (as defined herein) may comprise a three-way dimmer switch that may be used in a three-way lighting system and may include at least three load terminals (e.g., without a neutral connection). A two-wire dimmer switch may comprise a connection that may provide for communication with a remote control device (for remotely controlling the dimmer switch), e.g., without requiring the dimmer switch to be directly connected to neutral.

The LED driver 102 and the LED light source 104 may be both included in a single enclosure, for example, having a screw-in base adapted to be coupled to a standard Edison socket. When the LED driver 102 is included with the LED light source 104 in the single enclosure, the LED driver may have two electrical connections: to the dimmer switch 100 for receiving the phase-control voltage $V_{PC}$ and to the neutral side N of the AC power source 105. The LED driver 102 may comprise a rectifier bridge circuit 106 that may receive the phase-control voltage $V_{PC}$ and generate a bus voltage $V_{BUS}$ across a bus capacitor $C_{BUS}$. The LED driver 102 may comprise a load control circuit 107 that may receive the bus voltage $V_{BUS}$ and control the intensity of the LED light source 104 in response to the phase-control signal $V_{PC}$. Specifically, the load control circuit 107 of the LED driver 102 may be configured to turn the LED light source 104 on and off and to adjust the intensity of the LED light source to a target intensity $L_{TRGT}$ (e.g., a desired intensity) in response to the phase-control signal $V_{PC}$. The target intensity $L_{TRGT}$ may range between a low-end intensity $L_{LE}$ and a high-end intensity $L_{HE}$. The LED driver 102 may comprise a filter network 108 (e.g., for preventing noise generated by the load control circuit 107 from being conducted on the AC mains wiring). The LED driver may have a capacitive input impedance (e.g., because of the bus capacitor $C_{BUS}$ and/or the filter network 108). An example of the LED driver 102 is described in greater detail in U.S. Pat. No. 8,492,987, issued Jul. 23, 2013, entitled LOAD CONTROL DEVICE FOR A LIGHT-EMITTING DIODE LIGHT SOURCE, the entire disclosure of which is hereby incorporated by reference.

The LED driver 102 may comprise an artificial load circuit 109 for conducting current (e.g., in addition to the load current $I_{LOAD}$) through the dimmer switch 100. Accordingly, if the dimmer switch 100 includes a triac for generating the phase-control voltage $V_{PC}$, the artificial load circuit 109 may conduct enough current such that the magnitude of the total current conducted through the triac of the dimmer switch 100 exceeds the rated latching and holding currents of the triac. The artificial load circuit 109 may conduct a timing current if the dimmer switch 100 comprises a timing circuit and may conduct a charging current if the dimmer switch comprises a power supply, such that these currents need not be conducted through the load control circuit 107 and do not affect the intensity of the LED light source 104.

The artificial load circuit 109 may comprise a constant impedance circuit (e.g., a resistor) or may comprise a current source circuit. The artificial load circuit 109 may be controllable, such that the artificial load circuit may be enabled and disabled to thus selectively conduct current through the dimmer switch 100. The artificial load circuit 109 may be controlled to conduct different amounts of current depending upon the magnitude of the AC mains line voltage $V_{AC}$, the present time during a half cycle of the AC mains line voltage, or the present operating mode of the LED driver 102. Examples of artificial load circuits are described in greater detail in commonly-assigned U.S. Pat. No. 8,169,154, issued May 1, 2012, entitled VARIABLE LOAD CIRCUITS FOR USE WITH LIGHTING CONTROL DEVICES, and U.S. Patent Application Publication No. 2011/0121744, published May 26, 2011, entitled CONTROLLABLE-LOAD CIRCUIT FOR USE WITH A LOAD CONTROL DEVICE, the entire disclosures of which are hereby incorporated by reference.

The high-efficiency light source could comprise a compact fluorescent lamp (CFL) and the load regulation device could comprise an electronic dimming ballast. The dimmer switch 100 could control the amount of power delivered to other types of electrical loads, for example, by directly controlling a lighting load or a motor load. An example of a screw-in light source having a fluorescent lamp and an electronic dimming ballast is described in greater detail in U.S. Pat. No. 8,339,048, issued Dec. 25, 2012, entitled HYBRID LIGHT SOURCE, the entire disclosure of which is hereby incorporated by reference.

The dimmer switch 100 may comprise a user interface. The interface may include a rocker switch 116 and an intensity adjustment actuator 118 (e.g., a slider knob as shown in FIG. 1). The rocker switch 116 may allow for turning on and off the LED light source 104, while the intensity adjustment actuator 118 may allow for adjustment of the target intensity $L_{TRGT}$ of the LED light source 104 from the low-end intensity $L_{LE}$ to the high-end intensity $L_{HE}$. Examples of user interfaces of dimmer switches are described in greater detail in commonly-assigned U.S. Pat. No. 8,049,427, issued Nov. 1, 2011, entitled LOAD CONTROL DEVICE HAVING A VISUAL INDICATION OF ENERGY SAVINGS AND USAGE INFORMATION, the entire disclosure of which is hereby incorporated by reference.

Figure 2:
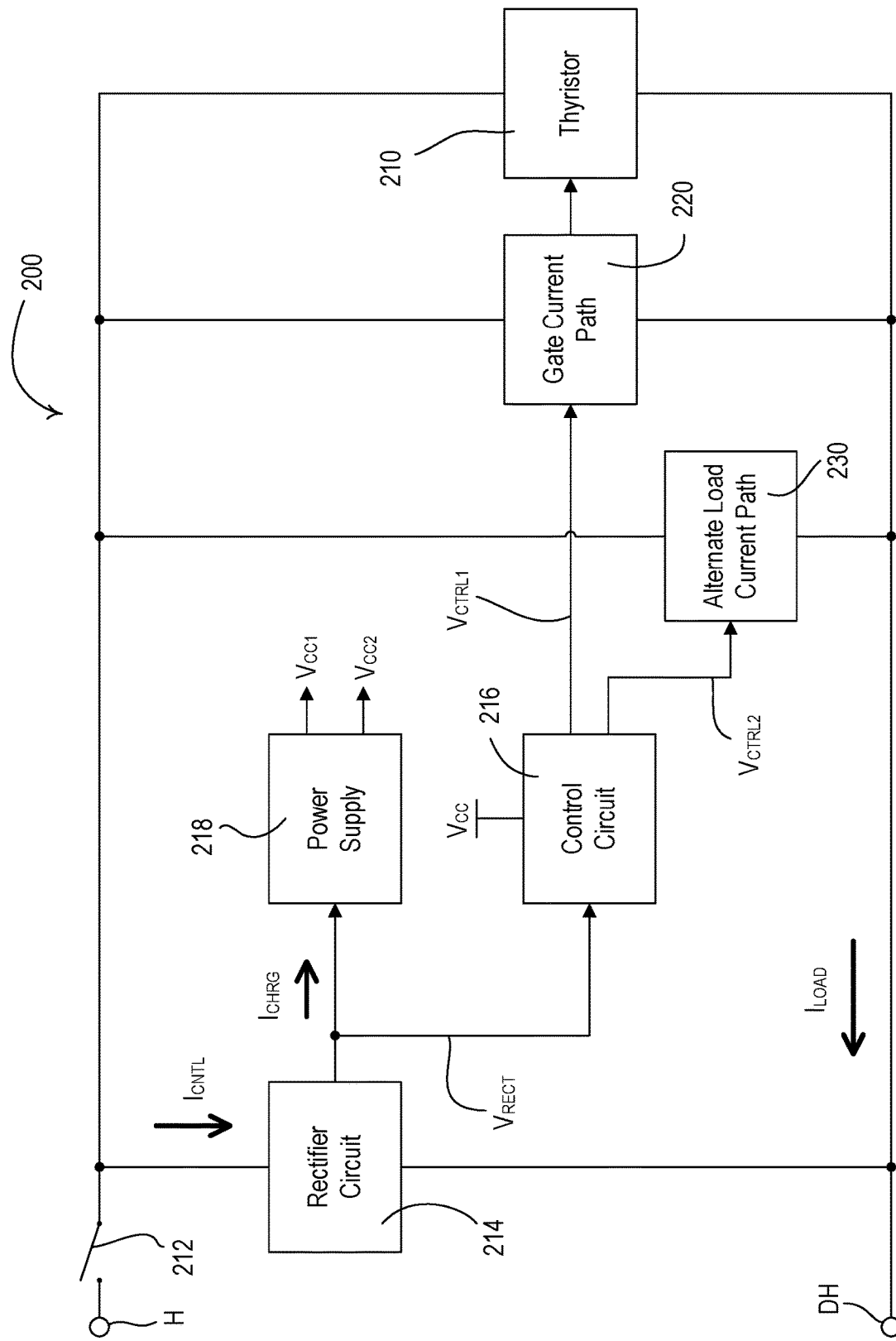
FIG. 2 is a simplified block diagram of an example dimmer switch.

FIG. 2 is a simplified block diagram of an example dimmer switch 200, which may be deployed as the dimmer switch 100 of FIG. 1. The dimmer switch 200 may comprise a bidirectional semiconductor switch, such as a thyristor 210 (e.g., a triac and/or one or more silicon-controlled rectifiers (SCRs)). The thyristor 210 may be electrically coupled between a hot terminal H and a dimmed hot terminal DH for generating a phase-control voltage $V_{PC}$ (e.g., a forward phase-control voltage) and conducting a load current $I_{LOAD}$ through an electrical load (e.g., the LED driver 102 shown in FIG. 1) for controlling of the amount of power delivered to the electrical load. The thyristor 210 may comprise a first main terminal electrically coupled to the hot terminal H and a second main terminal electrically coupled to the dimmed-hot terminal DH. The first and second main terminals may be configured to conduct a load current to energize the electrical load. The thyristor 210 may comprise a gate terminal (e.g., a control input), which may receive a control signal (e.g., a gate current) for rendering the thyristor conductive. The thyristor 210 may become non-conductive when the magnitude of a load current $I_{LOAD}$ conducted through the thyristor drops below a rated holding current of the thyristor. The phase-control voltage $V_{PC}$ may have a magnitude of approximately zero volts at the beginning of a half cycle (e.g., of each half cycle) of the AC power source 105, e.g., during a non-conduction time $T_{NC}$. The phase-control voltage $V_{PC}$ may have a magnitude equal to approximately the magnitude of the AC line voltage $V_{AC}$ of the AC power source 105 during the rest of the half cycle, e.g., during a conduction time $T_{CON}$. For example, the conduction time $T_{CON}$ may be approximately two milliseconds when the target intensity $L_{TRGT}$ of the LED light source 104 is at the low-end intensity $L_{LE}$ and approximately seven milliseconds when the target intensity $L_{TRGT}$ is at the high-end intensity $L_{HE}$. The bidirectional semiconductor switch of the dimmer switch 200 may comprise a field-effect transistor (FET) in a rectifier bridge, two FETs electrically coupled in anti-series connection, and/or one or more insulated gate bipolar junction transistors (IGBTs).

The dimmer switch 200 may comprise a mechanical air-gap switch 212 electrically coupled to the hot terminal H (e.g., in series with the thyristor 210), such that the electrical load may be turned off when the switch is open. When the air-gap switch 212 is closed, the dimmer switch 200 may be configured to control the thyristor 210 to control the amount of power delivered to the electrical load. The air-gap switch 212 may be mechanically coupled to an actuator of a user interface of the dimmer switch 200 (e.g., the rocker switch 116), such that the switch may be opened and closed in response to actuations of the actuator. The dimmer switch 200 may further comprise a rectifier circuit 214 that may be coupled across the thyristor 210 and may be configured to generate a rectified voltage $V_{RECT}$ (e.g., a signal indicating the magnitude of the voltage developed across the thyristor).

The dimmer switch 200 may comprise a control circuit 216, e.g., a digital control circuit, for controlling at least the thyristor 210. The control circuit 216 may receive the rectified voltage $V_{RECT}$ from the rectifier circuit 214 and may generate a first control signal $V_{CTRL1}$ for controlling the thyristor 210 to thus adjust the intensity of the LED light source 104, for example, in response to an actuator of the user interface of the dimmer switch 200 (e.g., the intensity adjustment actuator 118). The control circuit 216 may render the thyristor 210 conductive at a firing time in a half cycle (e.g., in each half cycle) of the AC power source. The dimmer switch 200 may further comprise a power supply 218 for generating a first supply voltage $V_{CC1}$ (e.g., approximately 8 volts) and/or a second supply voltage $V_{CC2}$ (e.g., approximately 4 volts). The power supply 218 (e.g., the second supply voltage $V_{CC2}$) may be used to power at least the control circuit 216. The power supply 218 may be coupled to a circuit common that allows the power supply to conduct a charging current $I_{CHRG}$ through the electrical load (e.g., the LED driver 102) in order to generate the first and second supply voltages $V_{CC1}$, $V_{CC2}$.

The dimmer switch 200 may further comprise a gate current path 220 electrically coupled between the control circuit 216 and the gate terminal of the thyristor 210. The gate current path 220 may be configured and/or controlled to render the thyristor conductive, e.g., in response to the first control signal $V_{CTRL1}$. The gate current path 220 may comprise an internal voltage-controlled controllably conductive device (not shown), such as two MOS-gated transistors (e.g., FETs) coupled in anti-series connection between the first main load terminal and the gate terminal of the thyristor 210. The gate current path 220 may draw power from the power supply 218 (e.g., the first supply voltage $V_{CC1}$) for driving the voltage-controlled controllably conductive device conductive to conduct gate current $I_G$ (e.g., a pulse of gate current) through the gate terminal of the thyristor 210 to render the thyristor conductive.

The voltage-controlled controllably conductive device of the gate current path 220 may draw an insignificant amount of net average current (e.g., substantially no net average current) from the power supply 218 (e.g., from the first supply voltage $V_{CC1}$) in order to conduct pulses of gate current $I_G$ through the gate terminal of the thyristor 210 to render the thyristor conductive. For example, the gates of the switching devices (e.g., FETs) of the voltage-controlled controllably conductive device may have input capacitances. To render the voltage-controlled controllably conductive device conductive, the gate current path 220 may only conduct a pulse of current from the power supply 218 due to the charging of the input capacitances. As used herein, "substantially no net average current" may be defined as an amount of current appropriate to charge the input capacitances of the gates of the FETs (or other suitable switching devices) of the gate current path 220. For example, "substantially no net average current" may mean a net average current of less than approximately one microamp.

The control circuit 216 may be configured to operate in a first gate drive mode (e.g., a pulse gate drive mode) over one or more half cycles of the AC power source. While operating in the first gate drive mode, the control circuit may be configured to render the gate current path 220 conductive for a short pulse time period $T_{PULSE}$ at or after the firing time in each of the one or more half cycles of the AC power source. The control circuit 216 may control the first control signal $V_{CTRL1}$ to render the gate current path 220 conductive, such that the gate current path may conduct a pulse of gate current $I_G$ through the gate terminal of the thyristor 210 to render the thyristor conductive. After the thyristor 210 has been rendered conductive, the control circuit 216 may control the first control signal $V_{CTRL1}$ to render the gate current path 220 non-conductive (e.g., after the short pulse time period $T_{PULSE}$). The thyristor 210 may remain conductive until the magnitude of the load current $I_{LOAD}$ conducted through the thyristor drops below the rated holding current of the thyristor.

The control circuit 216 may also be configured to operate in a second gate drive mode (e.g., a constant gate drive mode) over one or more half cycles of the AC power source. While operating in the second gate drive mode, the control circuit may be configured to provide constant gate drive to the thyristor 210. The control circuit 216 may control the first control signal $V_{CTRL1}$ to render the gate current path 220 conductive at or after the firing time in each of the one or more half cycles of the AC power source, such that the gate current path may conduct gate current $I_G$ through the gate terminal of the thyristor 210 to render the thyristor conductive. The control circuit may then maintain the gate current path conductive for the remainder of each of the half cycles (e.g., for a substantial portion of the remainder of each of the half cycles) after the firing time. As such, the thyristor 210 may be operable to remain conductive independent of the magnitude of the load current $I_{LOAD}$ conducted through the dimmer switch 200 and the electrical load (e.g., the LED driver 102). For example, when the thyristor 210 is conductive and the magnitude of the phase control voltage $V_{PC}$ is greater than approximately the magnitude of the bus voltage $V_{BUS}$ of the LED driver 102, the LED driver may begin to conduct the load current $I_{LOAD}$ through the thyristor 210. Since the bus capacitor $C_{BUS}$ of the LED driver 102 may charge quickly, the magnitude of the load current $I_{LOAD}$ may quickly peak before subsiding down to a substantially small magnitude (e.g., approximately zero amps). As previously mentioned, the thyristor 210 may remain conductive independent of the magnitude of the load current $I_{LOAD}$ because the control circuit 216 is providing constant gate drive (e.g., gate current) to the gate current path 220. In addition to quickly increasing and decreasing in magnitude, the load current $I_{LOAD}$ may also change direction after the thyristor 210 is rendered conductive (e.g., due to ringing in the filter network 108). The thyristor 210 may be operable to conduct current in both directions (e.g., to and from the LED driver 102) after the thyristor is rendered conductive at or after the firing time during a half cycle of the AC power source, thereby allowing any capacitors in the filter network 108 of the LED driver 102 to follow the magnitude of the AC line voltage $V_{AC}$ of the AC power source 105.

The control circuit 216 may be configured to render the gate current path 220 non-conductive (e.g., during the second gate drive mode) at a time $T_{NON-CON}$ before the end of a half cycle (e.g., every half cycle) to prevent further pulses of gate current $I_G$ from being conducted through the gate terminal of the thyristor 210 to thus allow the thyristor to commutate off and become non-conductive prior to the end of the half cycle. As a result, a dead time may exist between the time $T_{NON-CON}$ (e.g., when the control circuit 216 drives the drive voltage $V_{DR}$ to approximately circuit common) and the beginning of the next half cycle.

The dimmer switch 200 may further comprise an alternate load current path 230 configured to conduct the load current $I_{LOAD}$ when the thyristor 210 is non-conductive. The control circuit 216 may be configured to generate a second control signal $V_{CTRL2}$ for rendering the alternate load current path 230 conductive and non-conductive. For example, during the second gate drive mode, the control circuit 216 may be configured to render the alternate load current path 230 conductive between the time $T_{NON-CON}$ (e.g., after the gate current path 220 is rendered non-conductive) and the end of the half cycle.

Figure 3:
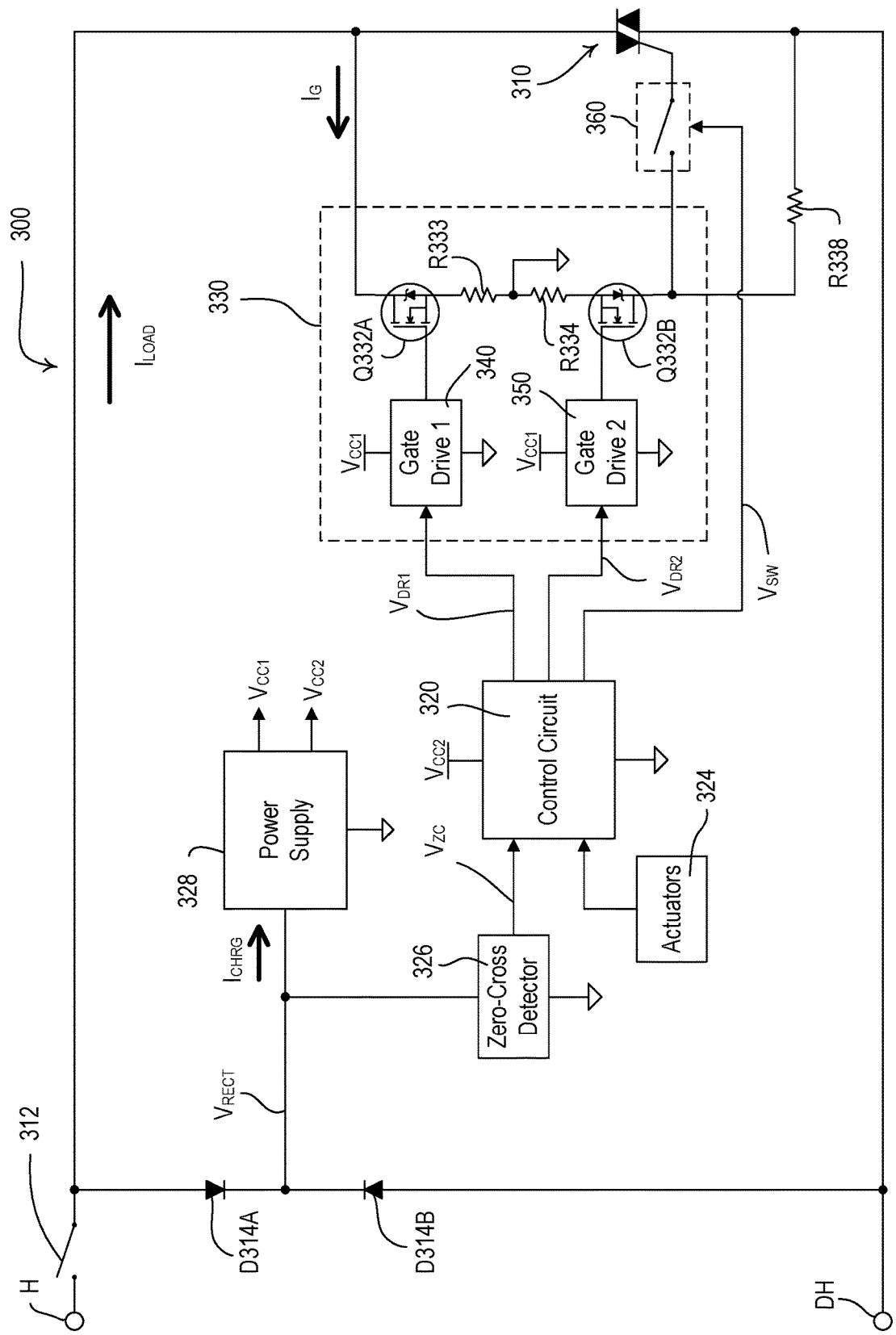
FIG. 3 is a simplified schematic diagram of an example dimmer switch.

FIG. 3 is a simplified schematic diagram of an example dimmer switch 300 (e.g., the dimmer switch 100 shown in FIG. 1 and/or the dimmer switch 200 shown in FIG. 2). The dimmer switch 300 may comprise a thyristor, e.g., a triac 310. The triac 310 may comprise first and second main terminals coupled between a hot terminal H and a dimmed hot terminal DH and a gate terminal configured to receive a control signal (e.g., a gate current) for rendering the triac conductive. The hot terminal H may receive a hot voltage $V_H$ from an AC power source (e.g., the AC power source 105). The triac 310 may be rendered conductive to generate a phase-control voltage $V_{PC}$ at the dimmed-hot terminal and conduct a load current $I_{LOAD}$ through an electrical load (e.g., the LED driver 102 shown in FIG. 1) for controlling of the amount of power delivered to the electrical load.

The dimmer switch 300 may comprise a control circuit 320, e.g., a digital control circuit having a processor, such as, a microprocessor, a programmable logic device (PLD), a microcontroller, an application specific integrated circuit (ASIC), a field-programmable gate array (FPGA), or any suitable controller or processing device. The control circuit 320 may be responsive to actuators 324 (e.g., the rocker switch 116 and/or the intensity adjustment actuator 118). The digital control circuit of the dimmer switch 300 may enable the dimmer switch to offer advanced features and functionality to a user. For example, the user may be able to adjust the features and functionality of the dimmer switch 300 using an advanced programming mode. The control circuit 320 may be operable to enter the advanced programming mode in response to one or more actuations of the actuators 324. For example, the user may adjust the low-end intensity $L_{LE}$ and the high-end intensity $L_{HE}$ between which the control circuit 320 may control the target intensity $L_{TRGT}$ of the LED light source 104. A dimmer switch having an advanced programming mode is described in greater detail in commonly-assigned U.S. Pat. No. 7,190,125, issued Mar. 13, 2007, entitled PROGRAMMABLE WALLBOX DIMMER, the entire disclosure of which is hereby incorporated by reference. In addition, the operation of the dimmer switch 300 may be configured using an external programming device (such as a smart phone, a tablet, or a laptop) as described in greater detail in commonly-assigned U.S. Patent Application Publication No. 2013/0026947, published Jan. 31, 2013, entitled METHOD OF PROGRAMMING A LOAD CONTROL DEVICE USING A SMART PHONE, the entire disclosure of which is hereby incorporated by reference.

The dimmer switch 300 may comprise a power supply 328 configured to conduct a charging current $I_{CHRG}$ through the electrical load (e.g., the LED driver 102) for generating a first DC supply voltage $V_{CC1}$ (e.g., approximately 8 volts) and a second DC supply voltage $V_{CC2}$ (e.g., approximately 4 volts). The power supply 328 may be used to power, for example, at least the microprocessor 320 (e.g., via the second DC supply voltage $V_{CC2}$). Both of the first and second DC supply voltages $V_{CC1}$, $V_{CC2}$ may be referenced to a circuit common and the power supply 328 may conduct the charging current $I_{CHRG}$ through circuit common. For example, the power supply 328 may comprise a resistor-zener power supply for generating the first DC supply voltage $V_{CC1}$ and a high-efficiency switching power supply for generating the second DC supply voltage $V_{CC2}$. The power supply 328 may comprise one or more linear regulators, or other suitable power supply, in addition to any combination of linear regulators, switching power supplies, and resistor-zener power supplies. As shown in FIG. 3, the dimmer switch 300 may not comprise a neutral terminal (e.g., to be coupled to the neutral side N of the AC power source 105). As such, the power supply 328 may be configured to conduct the charging current $I_{CHRG}$ through the electrical load. The power supply 328 may also be configured to not conduct the charging current $I_{CHRG}$ through an earth ground connection, as shown in FIG. 3.

The dimmer switch 300 may comprise a zero-cross detection circuit 326 that may generate a zero-cross signal $V_{ZC}$ that indicates the zero-crossings of the AC line voltage. Since the dimmer switch 300 may not comprise a neutral connection and/or an earth ground connection, the zero-cross detection circuit 326 may be coupled between the hot terminal H and the dimmed-hot terminal DH, and may be responsive to a dimmer voltage $V_{DIM}$ (e.g., the voltage across the dimmer switch 300). The zero-cross detection circuit 326 may be configured to drive the zero-cross signal $V_{ZC}$ low towards circuit common when the magnitude of the dimmer voltage $V_{DIM}$ rises above a zero-cross threshold (e.g., approximately 30 volts) during the positive half-cycles of the AC power source 105. The control circuit 320 may receive the zero-cross signal $V_{ZC}$ and may determine when to render the triac 310 conductive during a half cycle of the AC power source based on the indications of the zero-crossings from the zero-cross signal. The control circuit 320 may sample the zero-cross signal $V_{ZC}$ during a zero-cross window, e.g., once every line cycle (or every half cycle), to look for an indication of a zero-crossing. For example, a falling edge of the zero-cross signal $V_{ZC}$ at the beginning of the positive half-cycles may indicate a zero-crossing of the AC power source 105. The control circuit 320 may determine when to sample the zero-cross signal $V_{ZC}$ during a zero-cross window based on a previous zero-crossing time (e.g., approximately the period of one line cycle from the previous zero-crossing time). If the control circuit 320 does not detect an indication of a zero-crossing in a predetermined number of sequential line cycles (e.g., approximately three line cycles), the control circuit 320 may reset.

Although not shown in FIG. 3, the dimmer switch 300 may comprise a neutral terminal (not shown) adapted to be coupled to a neutral connection (e.g., the neutral side of the AC power source 105). For example, the power supply 328 may be coupled between the hot terminal H and the neutral terminal, such that the power supply may not conduct the charging current $I_{CHRG}$ through the electrical load. In addition, the dimmer switch 300 may comprise a neutral terminal zero-cross detection circuit (not shown) that may be coupled between the hot terminal H and the neutral terminal for generating a zero-cross signal indicating the zero-crossings of the AC power source 105.

If the dimmer switch 300 comprises a neutral terminal, the dimmer switch 300 may comprise either or both of the zero-cross detection circuit 326 (e.g., coupled between the hot terminal and the dimmed hot terminal) and the neutral terminal zero-cross detection circuit (e.g., coupled between the hot terminal H and the neutral terminal). The dimmer switch 300 may be configured to determine if the neutral terminal is electrically connected to the neutral side of the AC power source 105 in response to the neutral terminal zero-cross detection circuit. The dimmer switch 300 may be configured to operate in a two-wire mode in which the control circuit 320 is responsive to the zero-cross circuit 326 coupled between the hot terminal H and the dimmed hot terminal DH, and in a three-wire mode in which the control circuit is responsive to the neutral terminal zero-cross detection circuit (e.g., in response to determining that the neutral terminal is connected to the neutral side of the AC power source 105). An example of a dimmer switch configured to operate in two-wire and three-wire modes of operation is described in greater detail in commonly-assigned U.S. Pat. No. 7,859,815, issued Dec. 28, 2010, entitled ELECTRONIC CONTROL SYSTEMS AND METHODS, the entire disclosure of which is hereby incorporated by reference.

The dimmer switch 300 may comprise an earth ground terminal (not shown) adapted to be coupled to an earth ground connection. For example, the power supply 328 may be coupled between the hot terminal H and the earth ground terminal for leaking at least a portion of the charging current ICHRG through the earth ground connection (e.g., the power supply may not conduct any of the charging current $I_{CHRG}$ through the electrical load). In addition, the dimmer switch 300 may comprise an earth ground terminal zero-cross detection circuit (not shown) that may be coupled between the hot terminal H and the earth ground terminal for generating a zero-cross signal indicating the zero-crossings of the AC power source 105.

The dimmer switch 300 may comprise a gate coupling circuit 330 and a controllable switching circuit 360 electrically coupled in series between the control circuit 320 and the gate terminal of the triac 310. The gate coupling circuit 330 and the controllable switching circuit 360 may operate as a gate current path (e.g., the gate current path 220 shown in FIG. 2) for conducting pulses of gate current $I_G$ through the gate terminal of the triac 310 to render the triac conductive.

The gate coupling circuit 330 may comprise a voltage-controlled controllably conductive device, such as two MOS-gated transistors (e.g., FETs Q332A, Q332B) coupled in anti-series connection between the gate of the triac 310 and a first one of the main terminals of the triac 310 (e.g., the hot terminal H of the dimmer switch). The FETs Q332A, Q332B may comprise MOSFETs or any suitable voltage-controlled semiconductor switches, such as, for example, IGBTs. The sources of the FETs Q332A, Q332B may be coupled together through two source resistors R333, R334 (e.g., each having a resistance of approximately 10 Ω). The source resistors R333, R334 may operate to limit the magnitude of the gate current $I_G$ conducted through the gate of the triac 310 to a maximum gate current (e.g., approximately 0.6 amp). The junction of the source resistors R333, R334 may provide the circuit common for the power supply 328 to allow the power supply to conduct the charging current $I_{CHRG}$ through the electrical load.

The gate coupling circuit 330 may comprise first and second gate drive circuits 340, 350 that allow for control (e.g., independent control) of the FETs Q332A, Q332B. The control circuit 320 may generate two drive signals $V_{DR1}$, $V_{DR2}$ that are received by the respective gate drive circuits 340, 350 for rendering the respective FETs Q332A, Q332B conductive and non-conductive, such that the triac 310 may be rendered conductive to conduct the load current $I_{LOAD}$ to the electrical load (e.g., when the controllable switching circuit 360 is also rendered conductive). For example, the control circuit 320 may drive the respective drive signals $V_{DR1}$, $V_{DR2}$ high towards the second supply voltage $V_{CC2}$ to render the respective gate drive circuits 340, 350 conductive. The dimmer switch 300 may further comprise a full-wave rectifier bridge that may include the body diodes of the FETs Q332A, Q332B and the diodes D314A, D314B, and may generate the rectified voltage $V_{RECT}$ that is received by the control circuit 320 and the power supply 328.

The control circuit 320 may generate a switch control signal $V_{SW}$ for rendering the controllable switching circuit 360 conductive and non-conductive. When the controllable switching circuit 360 is conductive, the control circuit 320 may render the FETs Q332A, Q332B conductive to allow the gate coupling circuit 330 to conduct a pulse of gate current $I_G$ through the gate terminal of the triac 310 to render the triac conductive, e.g., at the firing time each half cycle. When operating in the first gate drive mode (e.g., the pulse gate drive mode), the control circuit 320 may control the drive signals $V_{DR1}$, $V_{DR2}$ to render both of the FETs Q332A, Q332B non-conductive (e.g., after the short pulse time period $T_{PULSE}$) so that the gate current $I_G$ may not be conducted through the gate terminal of the triac 310.

The dimmer switch 300 may comprise a resistor R338, which may have a resistance of, for example, approximately 90.9 Ω and may be coupled between the gate and a second one of the main terminals of the triac 310 (e.g., to the dimmed hot terminal DH of the dimmer switch). The gate coupling circuit 330 and the resistor R338 may operate as part of an alternate load current path (e.g., the alternate load current path 230 shown in FIG. 2). When operating in the second gate drive mode (e.g., the constant gate drive mode), the control circuit 320 may be configured to control the FETs Q332A, Q332B of the gate coupling circuit 330 to conduct the load current $I_{LOAD}$ to the electrical load via the alternate load current path after the triac 310 becomes non-conductive and before the end of the present half cycle. For example, the control circuit 320 may be configured to render the controllable switching circuit 360 non-conductive (e.g., at the time $T_{NON-CON}$ in the present half cycle) to disconnect the gate terminal of the triac 310 from the FETs Q332A, Q332B of the gate coupling circuit 330 before the end of each half cycle of the AC line voltage, such that the triac 310 is able to commutate off before the end of the half cycle. Between the time the triac 310 commutates off and the end of the present half cycle, the control circuit 320 may be configured to conduct the load current $I_{LOAD}$ to the electrical load via the alternate load current path.

Figure 4:
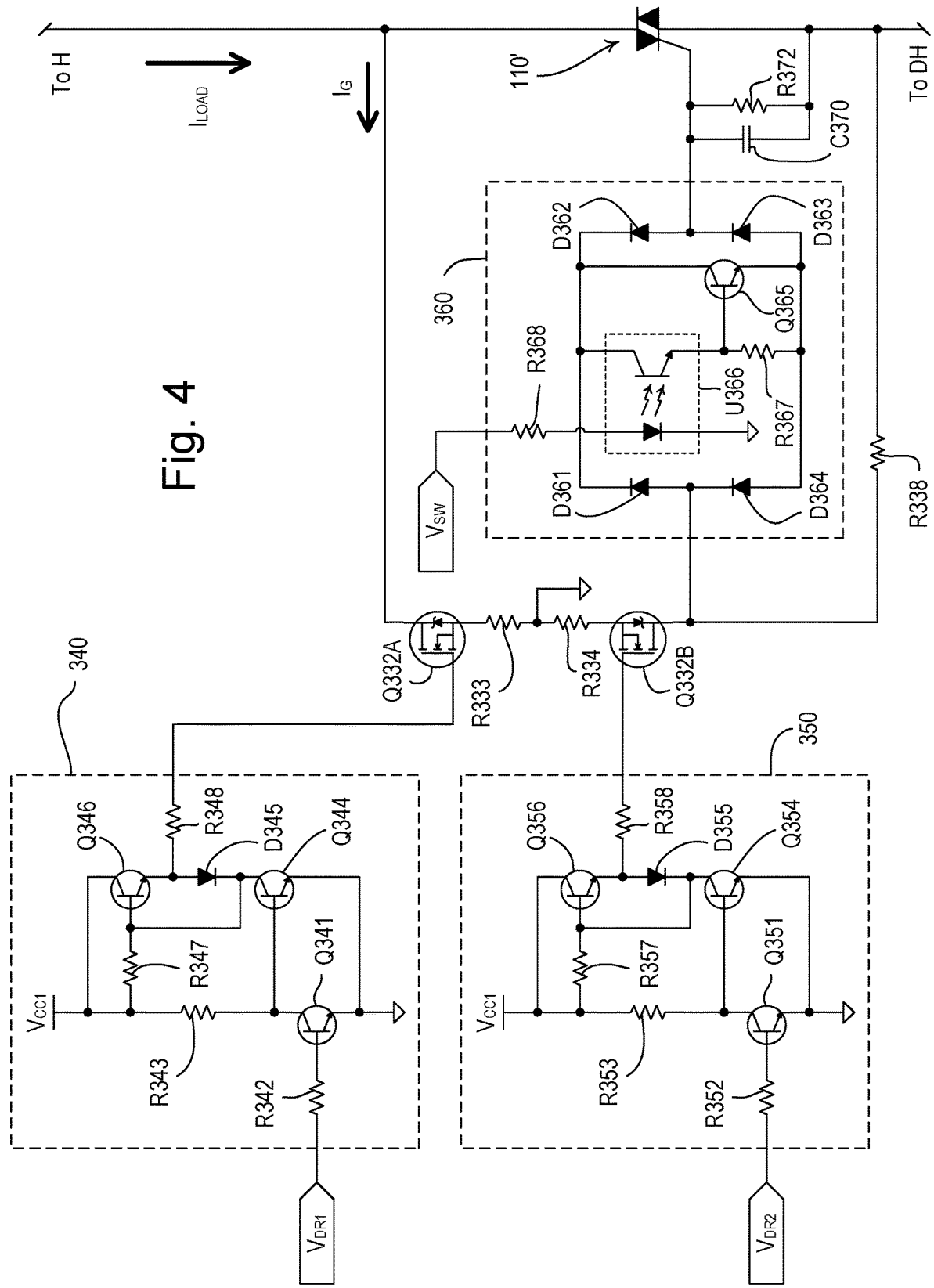
FIG. 4 is a simplified schematic diagram of a portion of the dimmer switch of FIG. 3 showing first and second gate coupling circuits and a controllable switching circuit in greater detail.

FIG. 4 is a simplified schematic diagram of a portion of the dimmer switch 300 showing the first and second gate drive circuits 340, 350 and the controllable switching circuit 360 in greater detail. The first gate drive circuit 340 may comprise an NPN bipolar junction transistor Q341 having a base that receives the first drive voltage $V_{DR1}$ via a resistor R342 (e.g., having a resistance of approximately 200 kΩ). The collector of the transistor Q341 may be coupled to the first DC supply voltage $V_{CC1}$ through a resistor R343 (e.g., having a resistance of approximately 200 kΩ), and to the base of another NPN bipolar junction transistor Q344. The collector-emitter junction of the transistor Q344 may be coupled in series with a diode D345 and the collector-emitter junction of another NPN bipolar junction transistor Q346. The base of the transistor Q346 may be coupled to the first DC supply voltage $V_{CC1}$ through a resistor R347 (e.g., having a resistance of approximately 200 kΩ) and to the collector of the transistor Q346. The junction of the transistor Q346 and the diode D345 may be coupled to the gate of the first FET Q332A through a gate resistor R348 (e.g., having a resistance of approximately 47 Ω).

When the magnitude of the first drive voltage $V_{DR1}$ is low (e.g., at approximately circuit common), the transistor Q341 may be non-conductive, such that the base of the transistor Q345 may be pulled up towards the first DC supply voltage $V_{CC1}$. Accordingly, the transistor Q345 may be rendered conductive, pulling the base of the transistor Q346 and the gate of the first FET Q332A down towards circuit common, such that the FET may be non-conductive. However, when the first drive voltage $V_{DR1}$ is high (e.g., at approximately the first DC supply voltage $V_{CC1}$), the transistor Q341 may become conductive, such that the transistor Q344 may be rendered non-conductive. Thus, the transistor Q346 may become conductive and the gate of the first FET Q332A may be driven up towards the first DC supply voltage $V_{CC1}$, such that the FET may be rendered conductive. The second gate drive circuit 350 may have a similar structure and operation (e.g., an identical structure and operation) for rendering the second FET Q332B conductive and non-conductive in response to the second drive voltage $V_{DR2}$.

The controllable switching circuit 360 may be coupled between the anti-series-connected FETs Q332A, Q332B and the gate terminal of the triac 310 and may be responsive to the switch control signal $V_{SW}$ from the control circuit 320. The gate terminal of the triac 310 may be coupled to one of the main terminals of the triac 310 through the parallel combination of a capacitor C370 (e.g., having a capacitance of approximately 0.1 μF) and a resistor R372 (e.g., having a resistance of approximately 47 Ω). The controllable switching circuit 360 may include a full-wave rectifier bridge comprising four diodes D361-D364. The AC terminals of the rectifier bridge may be coupled in series with the gate terminal of the triac 310, while an NPN bipolar junction transistor Q365 may be coupled across the DC terminals of the rectifier bridge. The controllable switching circuit 360 may comprise an optocoupler U366 having an output phototransistor that may be coupled in series with a resistor R367 across the DC terminals of the bridge. For example, the resistor R367 may have a resistance of approximately 150 kΩ. The switch control signal $V_{SW}$ may be coupled to the input photodiode of the optocoupler U366 via a resistor R368 (e.g., having a resistance of approximately 10 kΩ). When the switch control signal $V_{SW}$ is low, the output phototransistor of the optocoupler U366 may be non-conductive, such that the transistor Q365 may be non-conductive (e.g., the controllable switching circuit 360 may be non-conductive). However, when the switch control-voltage $V_{SW}$ is high, the output phototransistor of the optocoupler U366 may be rendered conductive, such that the transistor Q365 may be conductive (e.g., the controllable switching circuit 360 may be conductive and the gate of the triac 310 may receive current conducted by the anti-series-connected FETs Q332A, Q332B).

The control circuit 320 may be configured to operate in a pulse gate drive mode to render both the gate coupling circuit 330 and the controllable switching circuit 360 conductive for a short pulse time period $T_{PULSE}$ after the firing time in one or more half cycles (e.g., in each half cycle) of the AC power source. The gate coupling circuit 330 and the controllable switching circuit 360 may form part of a gate current path (e.g., the gate current path 220 shown in FIG. 2) between the control circuit 330 and the triac 310. By rendering both the gate coupling circuit 330 and the controllable switching circuit 360 conductive, the control circuit 320 may render the gate current path conductive. For example, the control circuit 320 may control the switch control signal $V_{SW}$ to render the controllable switching circuit 360 conductive and may control the first and second drive voltages $V_{DR1}$, $V_{DR2}$ to enable the FETs Q332A, Q332B to conduct a pulse of gate current $I_G$ via the gate current path and through the gate terminal of the triac 310 to render the triac 310 conductive. After the triac 310 has been rendered conductive, the control circuit 320 may control the switch control signal $V_{SW}$ to render the controllable switching circuit 360 non-conductive (e.g., after the short pulse time period $T_{PULSE}$) and thus to render the gate current path non-conductive. As a result, the gate current $I_G$ may cease to be conducted through the gate terminal of the triac 310 (e.g., after the short pulse time period $T_{PULSE}$).

The control circuit 320 may be configured to operate in a constant gate drive mode during one or more half cycles of the AC power source to provide constant gate drive (e.g., gate current) to the triac 310. The control circuit 320 may control the gate coupling circuit 330 and the controllable switching circuit 360 (e.g., and thus to control the gate current path) to conduct gate current $I_G$ (e.g., at the firing time of a half cycle) through the gate terminal of the triac 310 to render the triac 310 conductive. The control circuit may then maintain the gate current path conductive for the remainder of the half cycle (e.g., for a substantial portion of the remainder of the half cycle) so that further pulses of gate current $I_G$ may be conducted through the gate terminal of the triac 310. Accordingly, the triac 310 may be operable to remain conductive (e.g., due to the gate current $I_G$) independent of the magnitude of the load current $I_{LOAD}$ conducted through the dimmer switch 300 and the electrical load (e.g., the LED driver 102).

Figure 5:
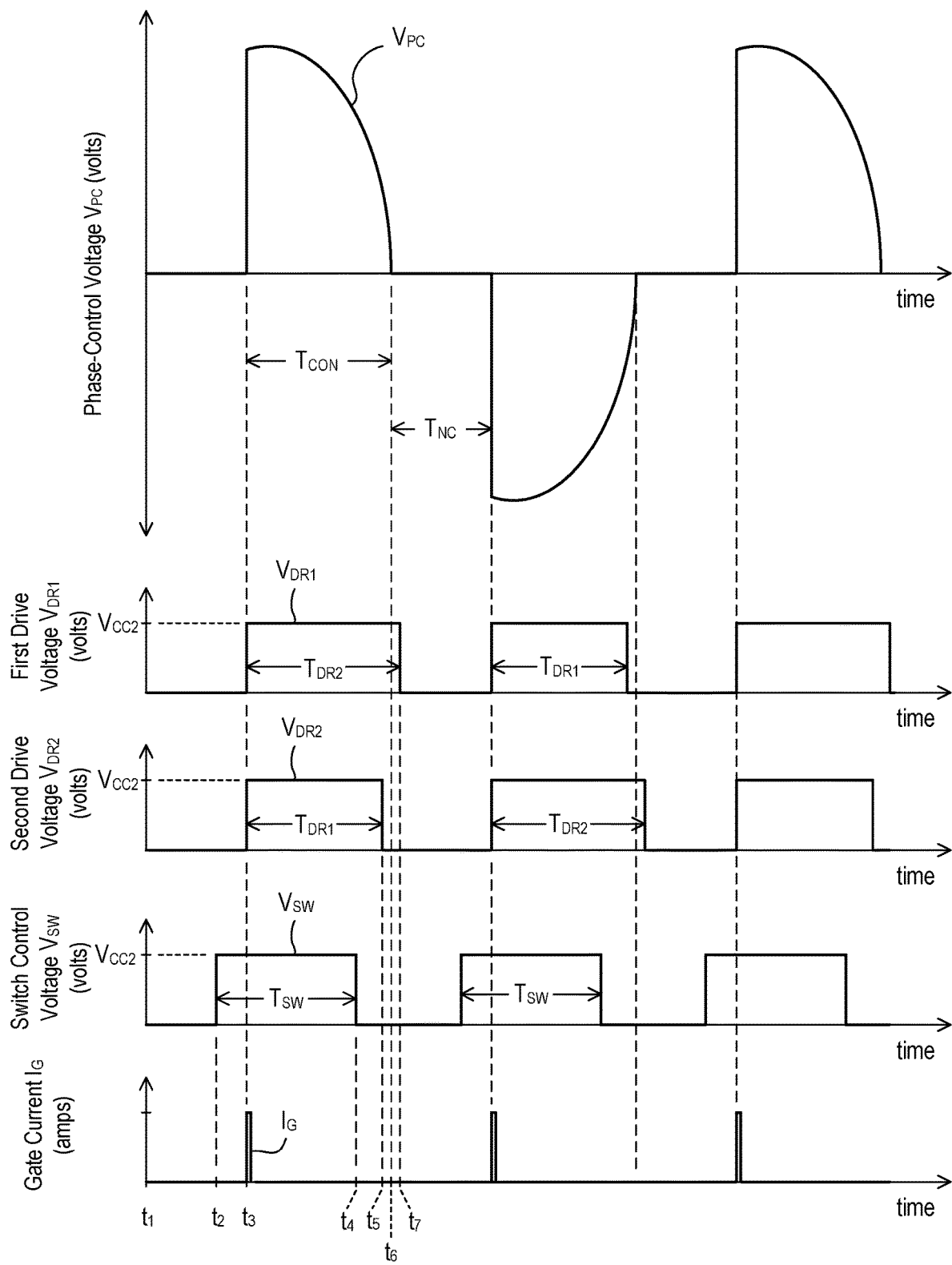
FIG. 5 shows example waveforms illustrating the operation of the dimmer switch of FIG. 3 when operating in a constant gate drive mode.

FIG. 5 shows example waveforms illustrating the operation of the dimmer switch 300 when the control circuit 320 is operating in the constant gate drive mode. The control circuit 320 may be configured to determine the zero-crossing of the AC line voltage at time $t_1$ in response to the zero-cross voltage $V_{ZC}$ generated by the zero-cross detection circuit 326. At the beginning of each half cycle (e.g., while operating in the constant gate drive mode), the control circuit 320 may be configured to render the FETs Q332A, Q332B non-conductive, such that the first FET Q332A blocks current during the positive half cycles and the second FET Q332B blocks current during the negative half cycles. The control circuit 320 may be configured to drive both of the drive voltages $V_{DR1}$, $V_{DR2}$ high at the same time, such that the FETs Q332A, Q332B are operable to conduct the gate current $I_G$ through the gate of the triac 310 (e.g., when the controllable switching circuit 360 is also rendered conductive) to render the triac conductive at the firing time (e.g., at time $t_3$ as shown in FIG. 5).

The control circuit 320 may be configured to render the FETs Q332A, Q332B conductive for different periods of time or durations. For instance, during a half cycle, the control circuit 320 may be configured to control one of the FETs Q332A, Q332B to be conductive for a first drive time period $T_{DR1}$ and to drive the other FET to be conductive for a second (and longer) drive time period $T_{DR2}$. As shown in FIG. 5, during a positive half cycle, the control circuit 320 may be configured to drive the second drive voltage $V_{DR2}$ low at time $t_5$ before the end of the half cycle (e.g., at time $t_6$ in FIG. 5), such that the second FET Q332B may be non-conductive and ready to block current at the beginning of a subsequent half cycle (e.g., a negative half cycle). After the second drive voltage $V_{DR2}$ is driven low at time $t_5$, the second FET Q332B may be configured to conduct current through its body diode until the end of the positive half cycle (e.g., to maintain the gate current path conductive). The control circuit 320 may be configured to drive the first drive voltage $V_{DR1}$ low after the end of the positive half cycle at time $t_7$, such that the first FET Q332A may remain conductive until the end of the present positive half cycle. Similarly, during a negative half cycle, the control circuit 320 may be configured to drive the first drive voltage $V_{DR1}$ low before the end of the negative half cycle and drive the second drive voltage $V_{DR2}$ low after the end of the negative half cycle.

The control circuit 320 may be configured to drive the switch control signal $V_{SW}$ high (e.g., at time $t_2$ as shown in FIG. 5) in a half cycle to cause the controllable switching circuit 360 to become conductive at the same time or prior to rendering the FETs Q332A, Q332B conductive, for example, approximately 40 μsec before the time $t_3$ when the FETs are rendered conductive. If the FETs Q332A, Q332B allow the gate terminal of the triac 310 to conduct the gate current $I_G$ too close to the end of the half cycle, the triac 310 may mistakenly be rendered conductive at the beginning of the next half cycle, which could cause the triac to be conductive for the entire next half cycle (e.g., to thus cause flicker in the LED light source 104). Therefore, the control circuit 320 may be configured to drive the switch control signal $V_{SW}$ low to cause the controllable switching circuit 360 to become non-conductive before the end of the present half cycle (e.g., at time $t_4$ in FIG. 5). For example, the control circuit 320 may be configured to drive the switch control signal $V_{SW}$ low at time $t_4$ approximately 600-1000 μsec before the end of the half cycle (which occurs at time $t_6$ in FIG. 5), such that the switch control signal $V_{SW}$ is high for a switch control time period $T_{SW}$ in the half cycle. Since the controllable switching circuit 360 may be controlled to be non-conductive before the end of the half cycle (e.g., to thus prevent further pulses of gate current $I_G$ from being conducted via the gate current path), the triac 310 may be able to commutate off when the magnitude of the load current $I_{LOAD}$ drops below the rated holding current of the triac. The triac 310 may not become conductive again during the present half cycle (e.g., due to the lack of a gate drive) and may remain non-conductive at the beginning of the next half cycle. If the electrical load (e.g., the LED driver 102) needs to conduct current after the triac 310 commutates off, the FETs Q332A, Q332B may be configured to conduct the load current $I_{LOAD}$ (e.g., via the alternate load current path described herein). Accordingly, the dimmer switch 300 may be configured to conduct the load current $I_{LOAD}$ through the electrical load independent of the rated holding current of the triac 310 and without driving the triac 310 to be conductive too close to the next half cycle.

Thus, as described herein, the gate current $I_G$ may be able to be conducted through the gate current path comprising the controllable switching circuit 360 and the FETs Q332A, Q332B of the gate coupling circuit 330 between the firing time $t_3$ and a transition time before the end of the half cycle (e.g., at time $t_4$ when the controllable switching circuit 360 is rendered non-conductive). The load current $I_{LOAD}$ may be able to be conducted through the alternate load current path comprising the resistor R338 and the FETs Q332A, Q332B of the gate coupling circuit 330 when the triac 310 commutates off near the end of the half cycle (e.g., after the transition time $t_4$ when the controllable switching circuit 360 is rendered non-conductive) until the end of the half cycle.

The control circuit 320 may be configured to operate in one or the other of the pulse gate drive mode and the constant gate drive mode. For example, the control circuit 320 may be configured to operate in the constant gate drive mode when the dimmer switch 300 is in a steady state condition, when the control circuit 320 is turning the LED light source 104 on or off, and when the target intensity $L_{TRGT}$ is dynamically changing (e.g., in response to an actuation of the intensity adjustment actuator 118).

For some high-efficiency lighting loads (e.g., particular models and/or products by particular manufacturers), turning on the high-efficiency lighting loads using the constant gate drive mode may cause fault conditions. For example, the control circuit 320 may not be able to determine accurate zero-crossing information from the zero-cross voltage $V_{ZC}$ generated by the zero-cross detection circuit 326 for some high-efficiency lighting loads while turning on the high-efficiency lighting loads using the constant gate drive mode. Accordingly, the control circuit 320 may not receive indications of zero-crossings of the AC line voltage when zero-crossings are expected, and may reset after detecting a predetermined number of missed zero-crossings.

Figure 6:
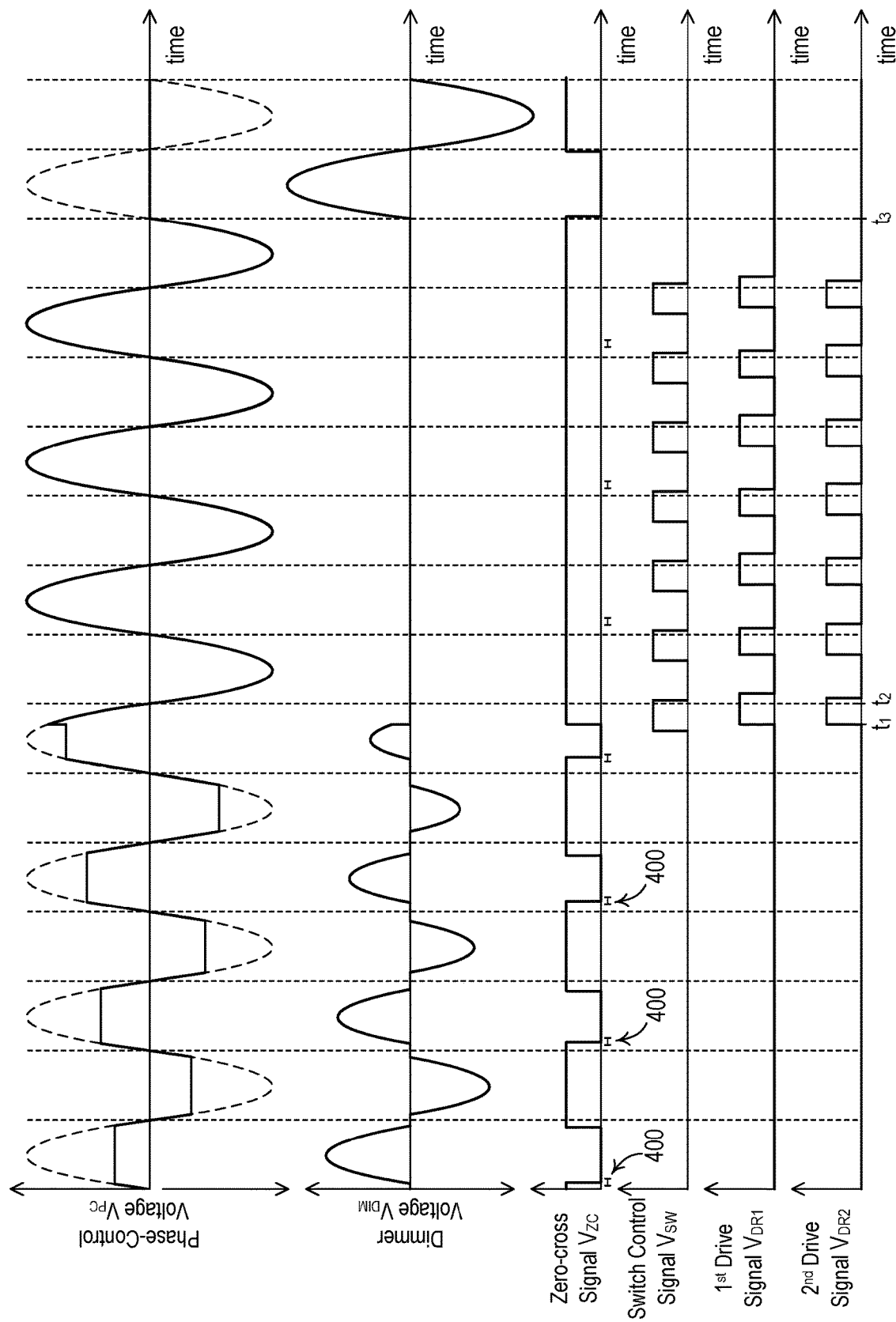
FIG. 6 shows example waveforms illustrating the operation of the dimmer switch of FIG. 3 when turning on an example LED light source using the constant gate drive mode.

FIG. 6 shows example waveforms illustrating the operation of the dimmer switch 300 when turning on an example LED light source using the constant gate drive mode. FIG. 6 illustrates the dimmer voltage $V_{DIM}$ (e.g., the voltage across the dimmer switch 300) and the zero-cross signal $V_{ZC}$ that is generated by the zero-cross detection circuit 326 from the dimmer voltage $V_{DIM}$. The control circuit 320 may be configured to detect indications of zero-crossings in response to the falling edges of the zero-cross signal $V_{ZC}$. The control circuit 320 may sample the zero-cross signal $V_{ZC}$ during zero-cross windows 400 near the beginning of each line cycle.

The high-efficiency lighting load 101 may draw (e.g., leak) current through the dimmer switch 300 when the LED light source 104 is off. This leakage current may charge the bus capacitor $C_{BUS}$ of the high-efficiency lighting load 101 and cause the voltage across the high-efficiency lighting load (e.g., the phase-control voltage) to increase in magnitude over one or more half cycles even though the triac 310 is non-conductive (as shown in the first three line cycles of FIG. 6). As a result, the voltage across the dimmer switch 300 (e.g., a dimmer voltage $V_{DIM}$) may decrease in peak magnitude in each of the one or more half cycles, which may cause the indications of the zero-crossings (e.g., the falling edges of the zero-cross signal $V_{ZC}$) and the zero-cross windows 400 to move later into a subsequent line cycle (as shown in FIG. 6). This may lead to incorrect detection of the zero-crossings and timing errors when rendering the triac 310 conductive. For example, when the control circuit 320 controls the drive signals $V_{DR1}$, $V_{DR2}$ to render the triac conductive at time $t_1$, the indication of the zero-crossing may be so late in the half cycle that the control circuit 320 may keep the gate coupling circuit 330 and the controllable switching circuit 360 conductive into the next half cycle (as shown at time $t_2$). This may cause the triac 310 to be rendered into full conduction (e.g., the phase-control voltage is equal to approximately the AC line voltage and the dimmer voltage $V_{DIM}$ is approximately zero volts) and remain fully conductive in one or more subsequent half cycles. The control circuit 320 may then not detect indications of zero-crossings during the next several (e.g., three) zero-cross windows 400 and may reset (e.g., at time $t_3$). This may cause undesirable flickering and/or blinking in the LED light source 104.

If the control circuit 320 controls the gate coupling circuit 330 and the controllable switching circuit 360 (e.g., to thus control the gate current path) using the pulse gate drive mode, the controllable switching circuit 360 (e.g., and thus the gate current path) may be rendered non-conductive long before the end of a half cycle and thus the triac 310 may not be rendered into full conduction in a subsequent half cycle. Therefore, the control circuit 320 may be configured to operate in the pulse gate drive mode when turning on the LED light source 104 and in the constant gate drive mode in the steady state condition (e.g., after the LED light source has been turned on).

Figure 7:
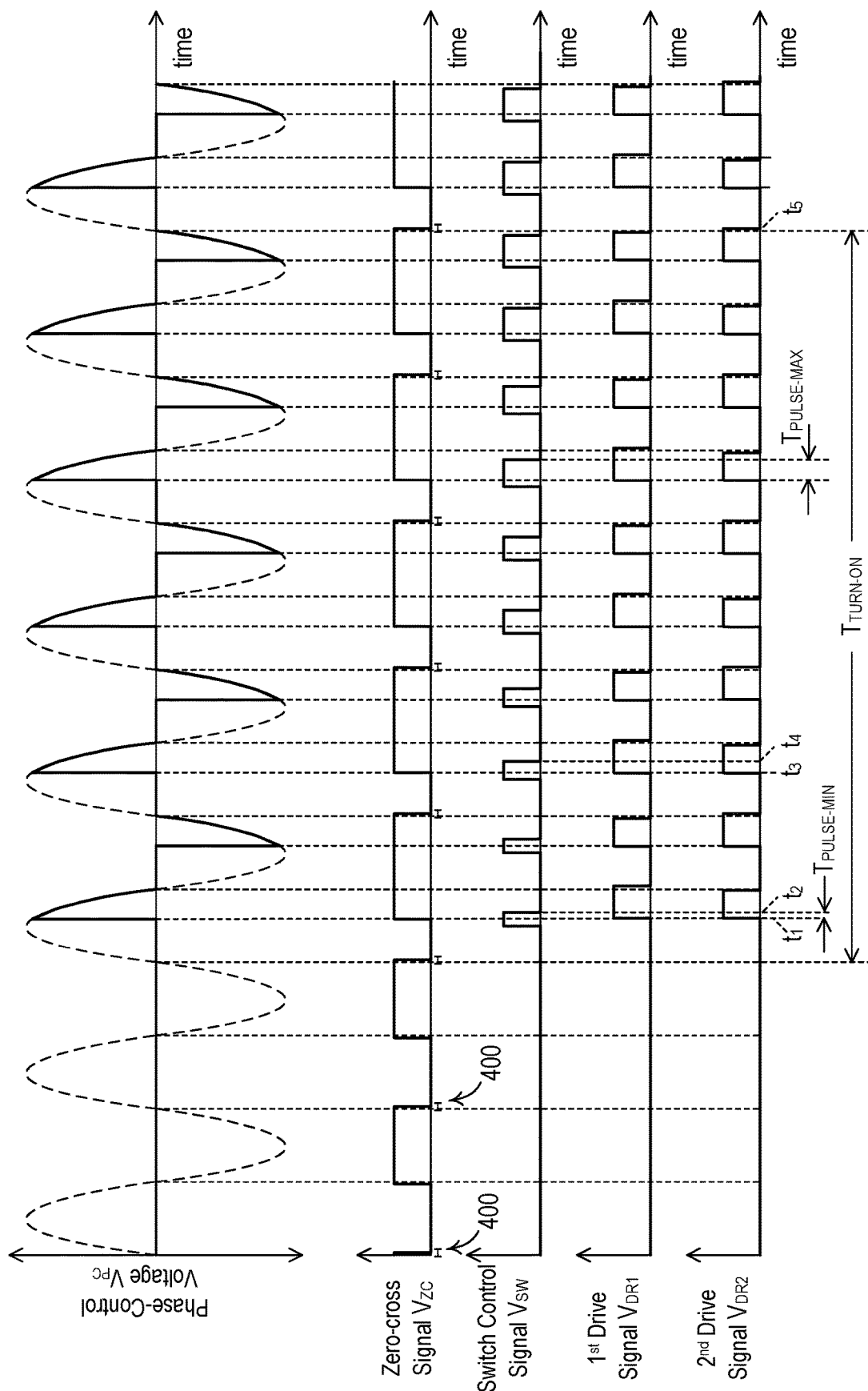
FIG. 7 shows example waveforms illustrating the operation of the dimmer switch of FIG. 3 when turning on an example LED light source using a pulse gate drive mode.

FIG. 7 shows example waveforms illustrating the operation of the dimmer switch 300 when turning on an example LED light source using the pulse gate drive mode. The control circuit 320 may be configured to control the gate coupling circuit 330 and the controllable switching circuit 360 (e.g., to thus control the gate current path) using the pulse gate drive mode for a turn-on time period $T_{TURN-ON}$ (which may comprise one or more half cycles of the AC power source), before changing to the constant gate drive mode during steady state conditions. The control circuit 320 may be configured to control the drive signals $V_{DR1}$, $V_{DR2}$ to render the gate coupling circuit 330 conductive at the firing time of a half cycle (e.g., at time $t_1$ in FIG. 7). At or before time $t_1$, the control circuit may control the switch control signal $V_{SW}$ to render the controllable switching circuit 360 conductive such that when the gate coupling circuit 330 becomes conductive at $t_1$, the triac may be rendered conductive (e.g., via gate current $I_G$ conducted over the gate current path and into the gate terminal of the triac).

The control circuit 320 may be configured to render the controllable switching circuit 360 non-conductive (e.g., to thus render the gate current path non-conductive) after a pulse time period $T_{PULSE}$ from the firing time by rendering the controllable switching circuit 360 non-conductive (e.g., at time $t_2$ in FIG. 7). The control circuit 320 may render the controllable switching circuit 360 non-conductive by driving the switch control signal $V_{SW}$ low (e.g., at time $t_2$). The control circuit 320 may control the drive signals $V_{DR1}$, $V_{DR2}$ to maintain the gate coupling circuit 330 conductive for a period of time before the end of the present half-cycle and after the controllable switching circuit 360 has been rendered non-conductive. This way, the load current $I_{LOAD}$ may be conducted through the alternate load current path described herein while the gate coupling circuit 330 remains conductive. Alternatively, the control circuit 320 may drive the drive signals $V_{DR1}$, $V_{DR2}$ low at the same time it drives the switch control signal $V_{SW}$ low (e.g., at time $t_2$ of the present half-cycle). This way, the load current $I_{LOAD}$ may not be conducted through the alternate load current path during the remainder of present half-cycle.

The control circuit 320 may adjust the length of the pulse time period $T_{PULSE}$ over one or more line cycles (or half cycles) during the turn-on time period $T_{TURN-ON}$. The one or more line cycles (or half cycles) may be consecutive. For example, the control circuit 320 may set the pulse time period $T_{PULSE}$ equal to a minimum pulse time period $T_{PULSE-MIN}$ (e.g., between times $t_1$ and $t_2$ with a value equal to approximately 100 µsec) during a first half cycle of the turn-on time period $T_{TURN-ON}$. The control circuit 320 may increase the pulse time period $T_{PULSE}$ by a predetermined increment $T_{INC}$ (e.g., approximately 20 µsec) during a subsequent half cycle (e.g., between times $t_3$ and $t_4$). The control circuit 320 may increase the pulse time period $T_{PULSE}$ by a same increment (e.g., approximately 20 µsec) or by varying amounts during consecutive line cycles (or half cycles) or during selected line cycles (which may not be consecutive) until the pulse time period is equal to a maximum pulse time period $T_{PULSE-MAX}$. The amount of increment (same or varying) be applied in a line cycle may be predetermined. The maximum pulse time period $T_{PULSE-MAX}$ may be equal to the length of the time period during which the gate current path remains conductive in a constant gate drive mode half cycle. The length of the pulse time period may be dependent upon what is required to drive the triac 310 using the constant gate drive mode to achieve a target intensity $L_{TRGT}$ of the light source (e.g., dependent upon a present firing time of the constant gate drive mode). As such, the maximum pulse time period $T_{PULSE-MAX}$ may be dependent upon the target intensity $L_{TRGT}$ to which the control circuit 320 is turning on the LED light source 104. Accordingly, at the end of the turn-on time period $T_{TURN-ON}$, the control circuit 320 may smoothly transition into the constant gate drive mode (e.g., at time $t_5$ in FIG. 7) to achieve the target intensity $L_{TRGT}$. For example, the maximum pulse time period $T_{PULSE-MAX}$ may be approximately 0.5 msec when the target intensity $L_{TRGT}$ is at the low-end intensity $L_{LE}$ and approximately 5.5 msec when the target intensity $L_{TRGT}$ is at the high-end intensity $L_{HE}$. In examples, the turn-on time period $T_{TURN-ON}$ may range from approximately 20 line cycles (at low-end) and approximately 270 line cycles (at high-end).

The control circuit 320 may maintain the pulse time period $T_{PULSE}$ constant during the turn-on time period $T_{TURN-ON}$. In such cases, the control circuit 320 may adjust the pulse time period $T_{PULSE}$ at the end of the turn-on time period $T_{TURN-ON}$ (and/or the beginning of the constant gate drive mode), so that the pulse time period $T_{PULSE}$ may be approximately equal to the gate pulse time period required to drive the triac 310 to achieve the target intensity $L_{TRGT}$ using the constant gate drive mode.

Figure 8:
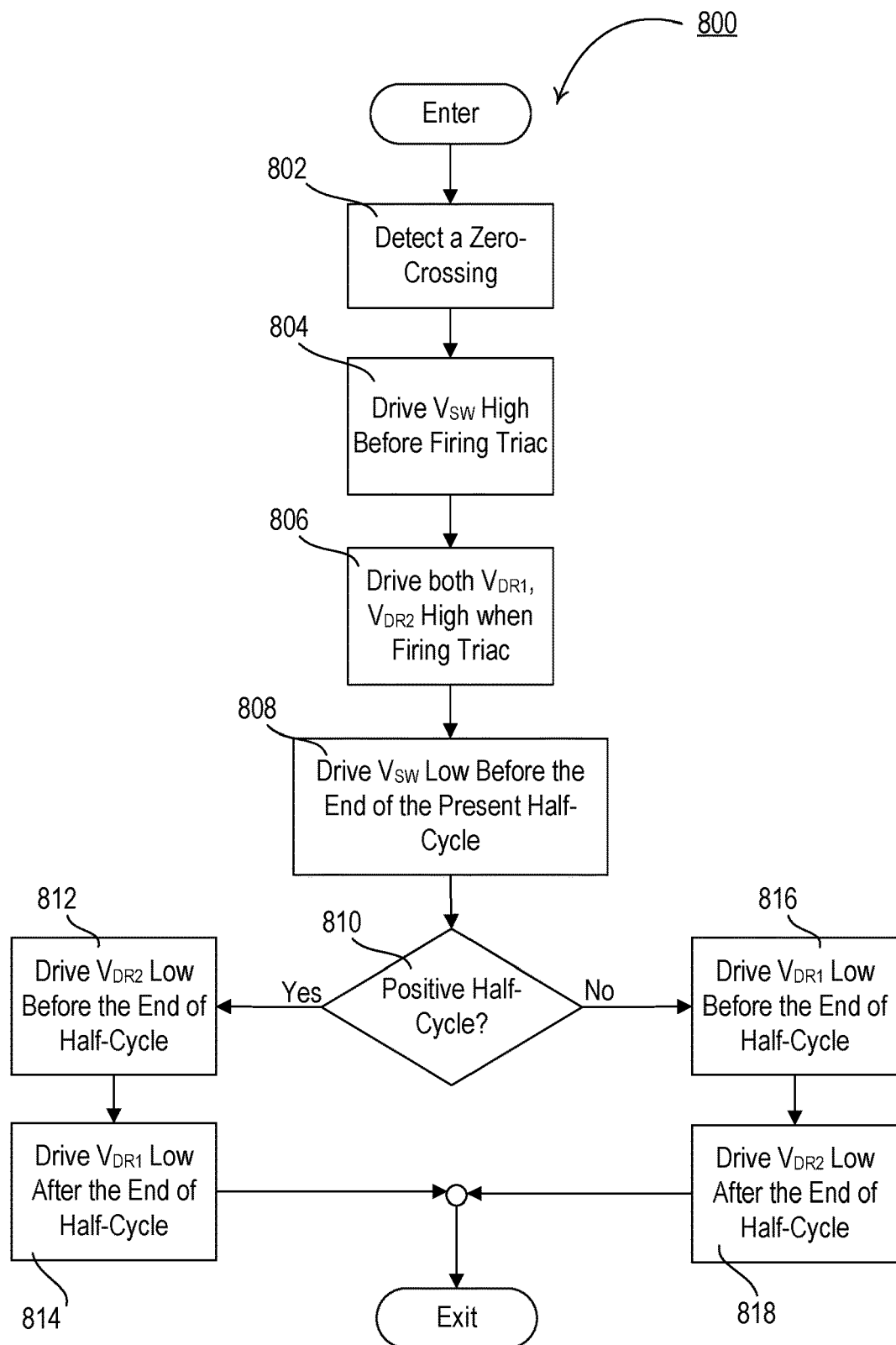
FIG. 8 shows an example diagram illustrating the operation of a dimmer switch described herein when turning on an example light source.

FIG. 8 shows an example procedure 800 for operating a dimmer switch (e.g., the dimmer switch 300 described herein). Using the dimmer switch 300 as an example, at 802, the control circuit 320 of the dimmer switch may detect a zero-crossing of the AC power source (e.g., via the zero-cross detection circuit 326). The control circuit may be configured to fire the triac 310 at a firing time of a present half-cycle in response to detecting the zero-crossing. At or before the firing time, the control circuit may, at 804, drive the switch control signal $V_{SW}$ high. At the firing time, the control circuit 320 may drive both of the drive voltages $V_{DR1}$, $V_{DR2}$ high (e.g., as shown at 806) to render the triac 310 conductive (e.g., via gate current $I_G$ conducted over the gate current path and into the gate terminal of the triac).

At 808, the control circuit 320 may drive the switch control signal $V_{SW}$ low before the end of the present half-cycle. During the constant gate drive mode, the control circuit 320 may drive the switch control signal $V_{SW}$ low close to the end of each half-cycle (e.g., approximately 600-1000 µsec before the end of the half cycle as shown at time $t_4$ in FIG. 5). During the pulse gate drive mode, the control circuit 320 may drive the switch control signal $V_{SW}$ low shortly after driving the drive voltages $V_{DR1}$, $V_{DR2}$ high (e.g., at the end of the minimum pulse time period $T_{PULSE-MIN}$ as shown at time $t_2$ in FIG. 7). When the control circuit 320 is turning on the lighting load, the time at which the control circuit may drive the switch control signal $V_{SW}$ low may vary, for example, dependent upon where the present half-cycle is in the turn-on time period $T_{TURN-ON}$ (which may comprise one or more half cycles of the AC power source). For example, during a first half-cycle of the turn-on time period $T_{TURN-ON}$, the control circuit 320 may drive the switch control signal $V_{SW}$ low after the pulse time period $T_{PULSE-MIN}$ from the firing time (e.g., the time at which the control circuit drives the drive voltages $V_{DR1}$, $V_{DR2}$ high). In one or more subsequent half-cycles, the control circuit 320 may be configured to increase (e.g., gradually widen) the length of the pulse time period. For instance, in a subsequent half-cycle, the control circuit 320 may drive the switch control signal $V_{SW}$ low at a time after the firing time, e.g., at the end of the pulse time period $T_{PULSE}$. For example, the control circuit 320 may increase the pulse time period $T_{PULSE}$ by the predetermined increment $T_{INC}$ (e.g., approximately 20 µsec) each line cycle during the turn-on time period $T_{TURN-ON}$, e.g., $$T_{PULSE} = T_{PULSE-MIN} + (N \cdot T_{INC}),$$

where N is a number that represents the current line cycle during the turn-on time period $T_{TURN-ON}$ and increases by one each line cycle (e.g., until the light source enters a steady state and/or the pulse time period reaches a maximum length $T_{PULSE-MAX}$).

At 810, the control circuit 320 may determine whether the present half-cycle of the AC power source is a positive or a negative half-cycle. If the present half-cycle is a positive half-cycle, the control circuit 320 may drive the drive voltage $V_{DR2}$ low before the end of the half-cycle (e.g., as shown at 812), and drive the drive voltage $V_{DR1}$ low after the end of the half-cycle (e.g., as shown at 814). Otherwise (e.g., if the present half-cycle is a negative half-cycle), the control circuit 320 may drive the drive voltage $V_{DR1}$ low before the end of the half-cycle (e.g., as shown at 816), and drive the drive voltage $V_{DR2}$ low after the end of the half-cycle (e.g., as shown at 818).

The control circuit 320 may be configured to first attempt to turn on the LED light source 104 using the constant gate drive mode, detect a fault condition (e.g., that the control circuit 320 resets), and subsequently attempt to turn on the LED light source 104 using the pulse gate drive mode in response to detecting the fault condition. If the control circuit 320 is able to turn on the LED light source 104 using the constant gate drive mode or the pulse gate drive mode without detecting fault conditions, the control circuit may be configured to store an indication of the suitable gate drive mode in memory for turning on the LED light source, such that the control circuit may use that gate drive mode at a subsequent time when the control circuit is attempting to turn on the LED light source 104. If the control circuit 320 is not able to turn on the LED light source 104 using either of the constant gate drive mode and the pulse gate drive mode, the control circuit 320 may attempt to turn on the LED light source using another mode of operation or another start-up routine as described herein.

More generally, a control circuit as described herein (e.g., the control circuit 320) may be configured to attempt one of a plurality of start-up routines for turning on the light source, detect a fault condition, and subsequently attempt another one of the plurality of start-up routines until a suitable start-up routine is identified that can turn on the light source without fault conditions. The start-up routines may each comprise one or more actions taken by the control circuit to turn on an electrical load. These may include operating the control circuit in a particular operation mode (e.g., the pulse gate drive mode or constant gate drive mode described herein), operating the control circuit in a combination of operation modes (e.g., with or without a particular order), or performing the functions of a particular operation mode in different manners.

For example, a start-up routine may comprise turning on the light source using the constant drive mode as described herein. A start-up routine may comprise controlling one or more components of the dimmer switch 300 in a particular manner such that a gate current may be conducted through the gate terminal of the thyristor for only a pulse time period after the firing time during a half-cycle of the AC power source (e.g., as described in association with FIG. 7 and with the pulse gate drive mode). For example, one start-up routine may comprise gradually increasing the pulse time period $T_{PULSE}$ in one or more half-cycles during the turn-on time period $T_{TURN-ON}$, while another start-up routine may comprise keeping the pulse time period $T_{PULSE}$ constant during the turn-on time period $T_{TURN-ON}$ and increasing the pulse time period $T_{PULSE}$ at the end of the turn-on time period $T_{TURN-ON}$. To further illustrate, one start-up routine may comprise driving the switch control signal $V_{SW}$ low (e.g., at $t_2$ of FIG. 7) before driving the drive voltages $V_{DR1}$, $V_{DR2}$ low (e.g., such that an alternate load current path may be maintained around the gate current path) while another start-up routine may comprise driving the switch control signal $V_{SW}$ low at the same time of driving the drive voltages $V_{DR1}$, $V_{DR2}$ low (e.g., such that an alternate load current path around the gate current path may be rendered non-conductive at the same time the gate current path is rendered non-conductive).

Figure 9:
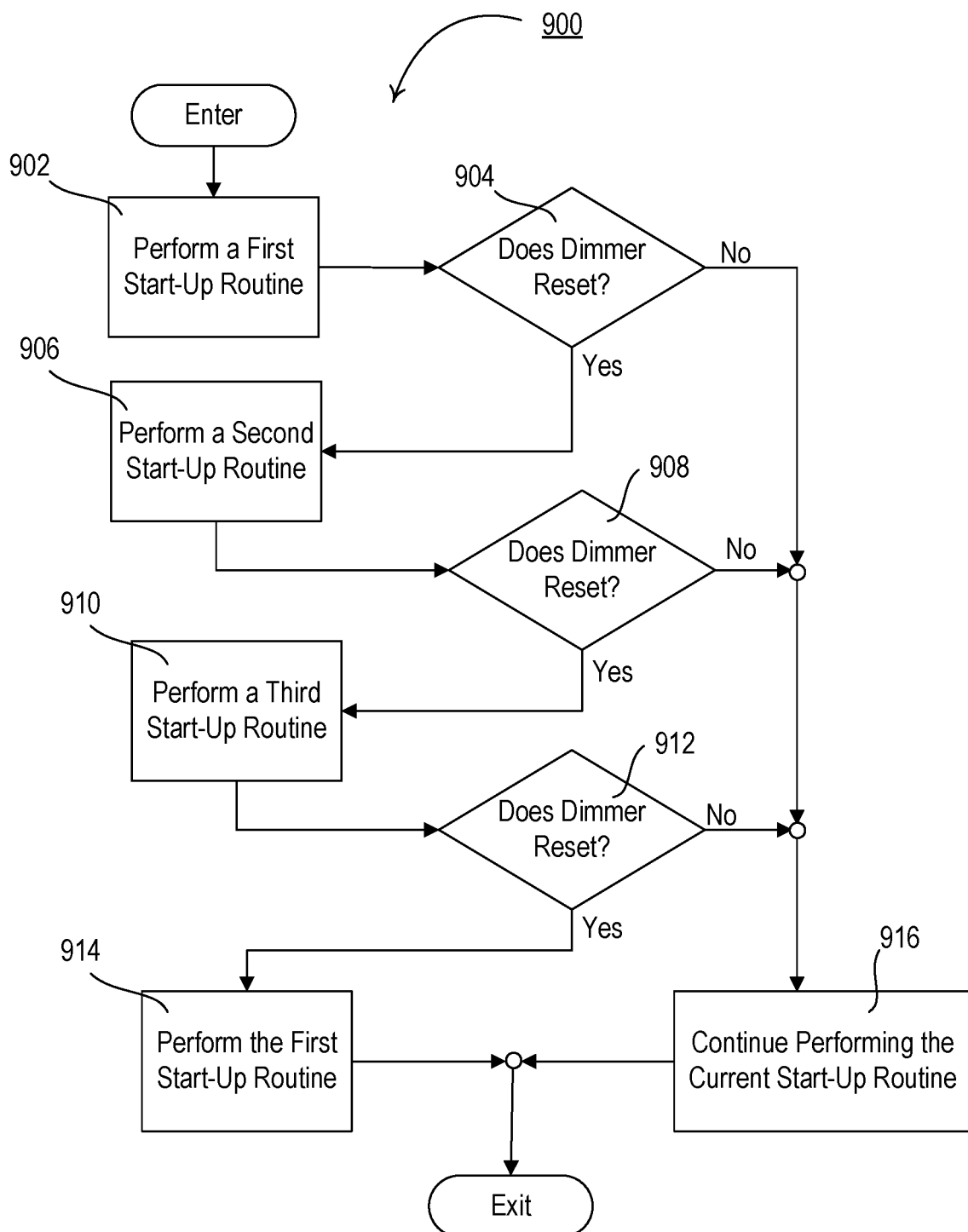
FIG. 9 shows an example diagram illustrating the operation of a dimmer switch described herein when turning on a light source using a plurality of start-up routines.

FIG. 9 shows an example procedure 900 for operating a dimmer switch (e.g., the dimmer switches 300 described herein) when turning on a light source. Using the dimmer switch 300 as an example, at 902, the control circuit 320 may attempt a first start-up routine (e.g., by using the constant gate drive mode described herein) to turn on the light source. At 904, the control circuit 320 may determine whether the dimmer has reset (e.g., which may represent a fault condition) during the first start-up routine. If no reset has occurred (e.g., the light source has not entered a fault condition), the control circuit 320 may continue performing the current start-up routine (and subsequent routines for operating the light source in a steady state) at 916. For example, if the control circuit 320 does not detect a fault condition while turning on the light source using the constant gate drive mode, the control circuit 320 may complete the start-up procedure and continue to operate the light source in a steady state with a steady state operation mode (e.g., which may also be the constant gate drive mode).

If a reset is detected at 904, the control circuit 320 may attempt a second start-up routine, at 906, to turn on the light source. The second start-up routine may comprise, for example, controlling one or more components of the dimmer switch 300 in a particular manner (e.g., as described herein) such that a gate current may be conducted through the gate terminal of the thyristor for only a pulse time period after the firing time during a half-cycle of the AC power source (e.g., as provided by the gate drive mode described herein). At 908, the control circuit 320 may determine whether the dimmer has reset (e.g., which may represent a fault condition) during the second start-up routine. If no reset has occurred (e.g., the light source has not entered a fault condition), the control circuit 320 may continue performing the current start-up routine (and subsequent routines for operating the light source in a steady state) at 916. For example, if the control circuit 320 does not detect a fault condition while turning on the light source using the second start-up routine, the control circuit 320 may complete the start-up procedure with the current start-up routine, and continue to operate the light source in a steady state with a steady state operation mode (e.g., which may be the constant gate drive mode).

If a reset is detected at 908, the control circuit 320 may attempt a third start-up routine, at 910, to turn on the light source. For example, the third start-up routine may comprise controlling one or more components of the dimmer switch 300 in a different manner than the second start-up routine such that a gate current may be conducted through the gate terminal of the thyristor for only a pulse time period after the firing time during a half-cycle of the AC power source (e.g., as provided by the gate drive mode described herein). For instance, the third start-up routine may comprise setting the pulse time period to a first value (e.g., to $T_{PULSE-MIN}$) in a first half-cycle of the AC power source, and then increasing (e.g., gradually increasing) the pulse time period in one or more subsequent half-cycles (e.g., consecutive half-cycles) of the AC power source. At 912, the control circuit 320 may determine whether the dimmer has reset (e.g., which may represent a fault condition) during the third start-up routine. If no reset has occurred (e.g., the light source has not entered a fault condition), the control circuit 320 may continue performing the current start-up routine (and subsequent routines for operating the light source in a steady state) at 916. If a reset is detected at 912, the control circuit 320 may revert to performing the first start-up routine, and the actions described herein may be repeated.

Although three start-up routines are shown as an example in FIG. 9, it should be noted that the scope of the disclosure is not limited by such an example. The control circuit 320 may be configured to choose from more or fewer than three start-up routines to start up the electrical load. For example, when more than three start-up routines are available, the control circuit 320 may perform the additional start-up routines after 914 in a similar manner as that illustrated in association with 904-914.

If the dimmer switch 300 has a neutral terminal and the control circuit 320 determines that the neutral terminal is connected to the neutral side of the AC power source 105, the control circuit may be configured to operate in the pulse gate drive mode in multiple situations (e.g., including at all times). For example, the control circuit 320 may be configured to operate in the pulse gate drive mode when the dimmer switch 300 is in the steady state condition, when the control circuit 320 is presently turning the LED light source 104 on or off, and when the target intensity $L_{TRGT}$ is dynamically changing. If the control circuit 320 determines that the neutral terminal is not connected to the neutral side of the AC power source 105, the control circuit may be configured to operate in the constant gate drive mode both when turning on the electrical load and when in the steady state condition (e.g., including at all times), or to operate in the pulse gate drive mode when turning on the LED light source 104 and then operating in the constant gate drive mode when in the steady state condition.

The control circuit 320 may be configured to operate in one of the constant gate drive mode and the pulse gate drive mode in response to a user input received, for example, from actuations of the actuators 324 during the advanced programming mode and/or from an external programming device (such as a smart phone, a tablet, or a laptop).

Figure 10:
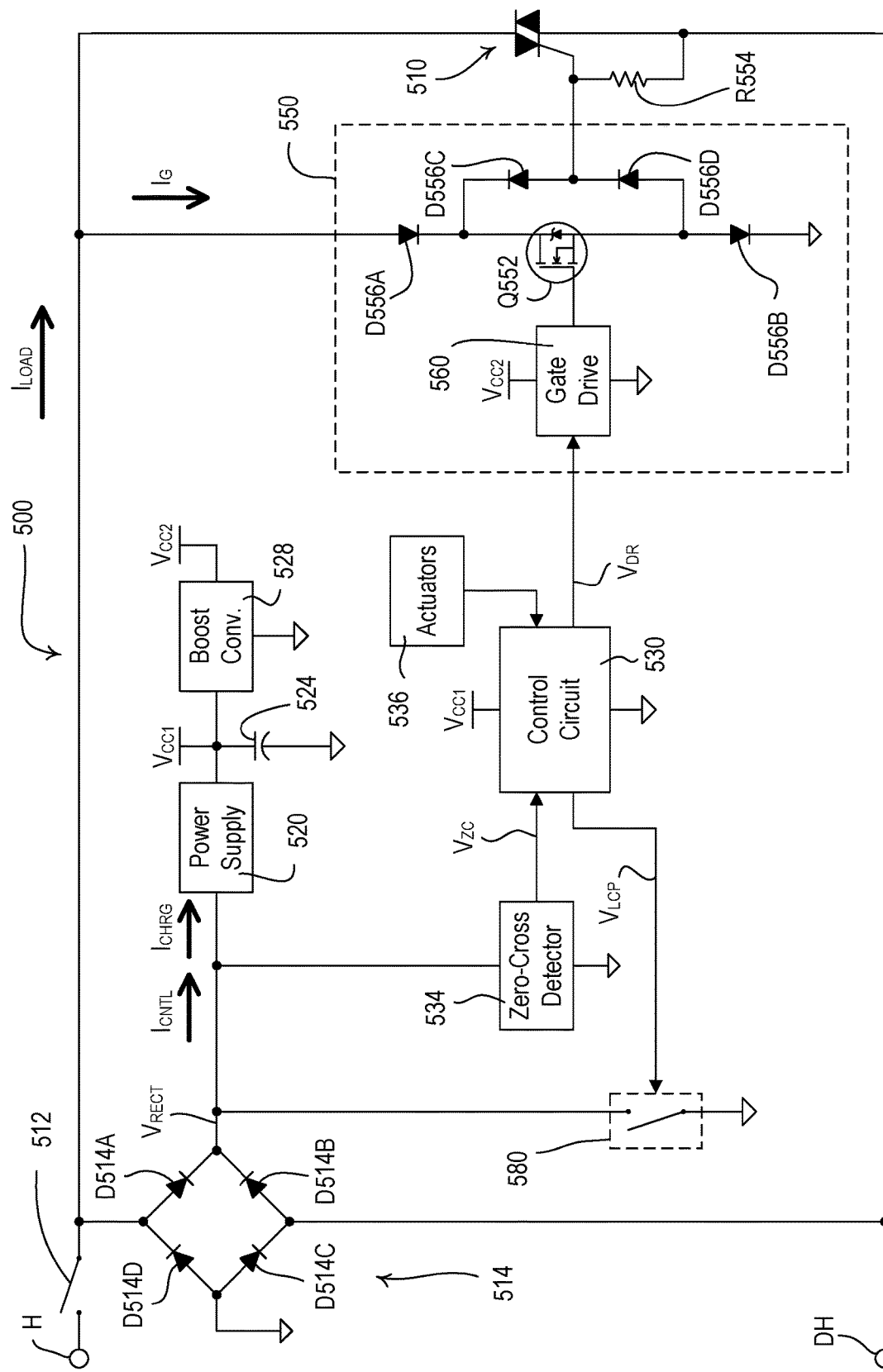
FIG. 10 is a simplified block diagram of another example dimmer switch.

FIG. 10 is a simplified block diagram of another load control device, e.g., a dimmer switch 500, which may be deployed as the dimmer switch 100 of FIG. 1 or the dimmer switch 200 of FIG. 2. The dimmer switch 500 may comprise a full-wave rectifier bridge 514 (including four diodes D514A, D514B, D514C, D514D) that has AC terminals electrically coupled in series between a hot terminal H and a dimmed hot terminal DH, and DC terminals for providing a rectified voltage $V_{RECT}$ to a control circuit 530 (e.g., a digital control circuit). The control circuit 530 may comprise a processor, e.g., a microprocessor, a programmable logic device (PLD), a microcontroller, an application specific integrated circuit (ASIC), a field-programmable gate array (FPGA), or any suitable controller or processing device. The dimmer switch 500 may comprise a gate coupling circuit 550 electrically coupled in series between the control circuit 530 and the gate terminal of the triac 510. The gate coupling circuit 550 may operate as part of a gate current path (e.g., the gate current path 220 shown in FIG. 2) for conducting pulses of gate current $I_G$ through the gate terminal of the triac 510 to render the triac conductive.

The gate coupling circuit 550 may comprise a voltage-controlled controllably conductive device, such as a single MOS-gated transistor (e.g., a FET Q552) inside of a full-wave rectifier bridge that includes diodes D556A-D556D (as well as the diode D514D). The FET Q552 may be coupled across the DC terminals of the full-wave rectifier bridge, while the AC terminals are coupled between the hot terminal H and the gate of the triac 510. The gate coupling circuit 550 may receive a drive voltage $V_{DR}$ from the control circuit 530, and the drive voltage $V_{DR}$ may be coupled to the gate of the FET Q552 via a gate drive circuit 560. When the FET Q552 is rendered conductive, a pulse of gate current $I_G$ may be conducted through the FET Q552, the diodes D556A, D556D, and the gate terminal of the triac 510 during positive half cycles of the AC power source to render the triac conductive. During negative half cycles of the AC power source, a pulse of gate current $I_G$ may be conducted through the gate terminal of the triac 510, the FET Q552, and the diodes D556B, D556C and the diode D514D. While not shown as such in FIG. 10, the diode D556B may comprise four diodes coupled in series to ensure that the diode D556D is forward biased during the positive half cycles.

The dimmer switch 500 may comprises one or more actuators 536 (e.g., the rocker switch 116 and/or the intensity adjustment actuator 118) for receiving user inputs and a zero-cross detection circuit 534 for generating a zero-cross voltage $V_{ZC}$ representative of the zero-crossing of the AC line voltage $V_{AC}$. The control circuit 530 may be configured to render the triac 510 conductive in response to the zero-cross detection circuit 534 and/or the actuators 536. The dimmer switch 500 may further comprise a resistor 554 (e.g., having a resistance of approximately 30-47 Ω) coupled between the gate of the triac 510 and the dimmed hot terminal DH (e.g., the second main load terminal of the triac 510).

The dimmer switch 500 may comprise a power supply 520 for generating a first DC supply voltage $V_{CC1}$ (e.g., approximately 2.8 volts) for powering the control circuit 530 and a boosting power supply, e.g., a boost converter 528, which may receive the first DC supply voltage $V_{CC1}$ and generate a second boosted DC supply voltage $V_{CC2}$ (e.g., approximately 15 volts) for driving the FET Q552 of the gate coupling circuit 550.

The dimmer switch 500 may further comprise a controllable switching circuit 580. The controllable switching circuit 580 may be coupled to the DC terminals of the full-wave rectifier bridge 514, such that the controllable switching circuit 580 may be coupled in parallel electrical connection with the triac 510. The controllable switching circuit 580 may operate as an alternate load current path (e.g., similar to the alternate load current path 230 shown in FIG. 2) to allow the load current $I_{LOAD}$ to flow through the electrical load when the triac is non-conductive. The control circuit 530 may generate a load-current-path control signal $V_{LCP}$ for rendering the controllable switching circuit 580 (and thus the gate current path) conductive and non-conductive. For example, the controllable switching circuit 580 may comprise a field-effect transistor (FET) or other suitable semiconductor switch or switching circuit coupled across the DC terminals of the full-wave rectifier bridge 514. The controllable switching circuit 580 may comprise a drive circuit (not shown) for providing the second DC supply voltage $V_{CC2}$ to the gate of the FET for rendering the FET conductive, e.g., in response to the load-current-path control signal $V_{LCP}$. The controllable switching circuit 580 may comprise a bidirectional semiconductor switch (such as a triac or two FETs in anti-series connection) or other suitable switching circuit coupled across the AC terminals of the full-wave rectifier bridge 514.

The control circuit 530 may be configured to operate in a pulse gate drive mode to render the gate coupling circuit 550 (and thus the gate current path) conductive for a short pulse time period $T_{PULSE}$ after the firing time in a half cycle. The control circuit 530 may control the drive voltage $V_{DR}$ to render the gate coupling circuit 550 conductive to allow the FET Q552 to conduct a pulse of gate current $I_G$ through the gate terminal of the triac 510 to render the triac conductive. After the triac 510 has been rendered conductive, the control circuit 530 may control the drive voltage $V_{DR}$ to render the gate coupling circuit 550 (and thus the gate current path) non-conductive (e.g., after the short pulse time period $T_{PULSE}$) during the remainder of the half cycle (e.g., during a substantial portion of the remainder of the half cycle).

The control circuit 530 may be configured to operate in a constant gate drive mode to provide constant gate drive to the triac 510. The control circuit 530 may control the drive voltage $V_{DR}$ to render the gate coupling circuit 550 (and thus the gate current path) conductive at the firing time of a half cycle, such that gate current $I_G$ may be conducted through the gate terminal of the triac 510 to thus render the triac 510 conductive at the firing time. The control circuit may then maintain the gate coupling circuit 550 (and thus the gate current path) conductive for the remainder of the half cycle (e.g., for a substantial portion of the remainder of the half cycle) after the firing time. Accordingly, the triac 510 may be operable to remain conductive (e.g., due to the gate current $I_G$) independent of the magnitude of the load current $I_{LOAD}$ conducted through the dimmer switch 500 and the electrical load (e.g., the LED driver 102).

Figure 11:
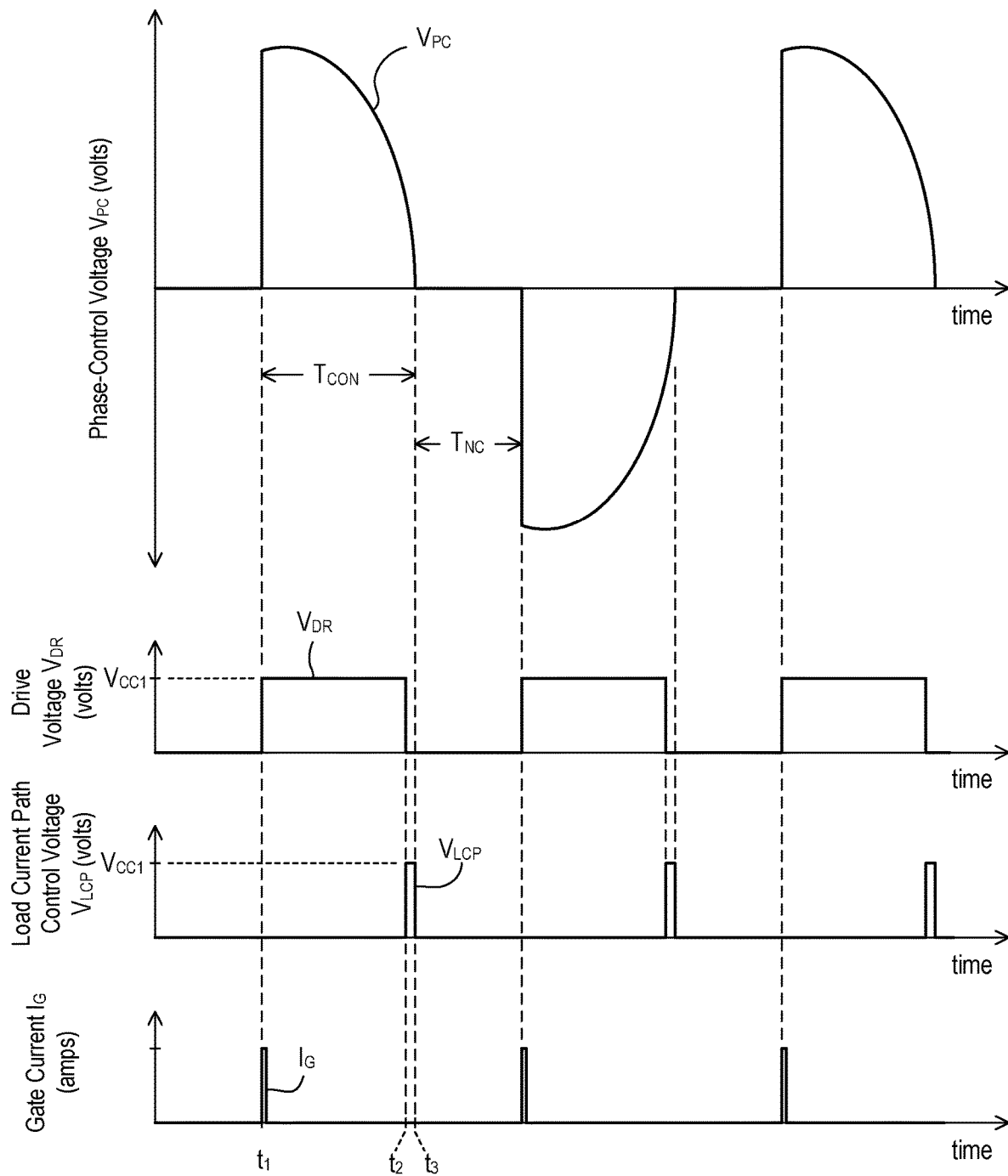
FIG. 11 shows example waveforms illustrating the operation of the dimmer switch of FIG. 10 when operating in a constant gate drive mode.

FIG. 11 shows example waveforms illustrating the operation of the dimmer switch 500 of FIG. 10 when operating in the constant gate drive mode. The control circuit 530 may drive the drive voltage $V_{DR}$ high towards the first DC supply voltage $V_{CC1}$ to render the gate coupling circuit 580 (and thus the gate current path) conductive at the firing time (e.g., at time $t_1$ in FIG. 11) of one or more half cycles. The gate current $I_G$ may then be conducted through the gate of the triac to render the triac 510 conductive. The control circuit 530 may maintain the drive voltage $V_{DR}$ high to keep the gate coupling circuit 550 (and thus the gate current path) conductive after the firing time $t_1$ until a transition time (e.g., at time $t_2$) before the next zero-crossing (e.g., approximately 600 microseconds before the next zero-crossing). Since the gate coupling circuit 550 is rendered non-conductive before the end of the half cycle, the triac 510 may be able to commutate off when the magnitude of the load current $I_{LOAD}$ drops below the rated holding current of the triac. The triac 510 may not be rendered conductive again during the present half cycle and may remain non-conductive at the beginning of the next half cycle.

The control circuit 530 may drive the load current path control signal $V_{LCP}$ high to render the controllable switching circuit 580 conductive at approximately the transition time $t_2$, such that the controllable switching circuit is able to conduct the load current $I_{LOAD}$ if the triac 510 commutates off before the end of the half cycle. For example, the control circuit 530 may drive the load current path control signal $V_{LCP}$ high before driving the drive voltage $V_{DR}$ low to render the gate coupling circuit 550 non-conductive (e.g., approximately 10 microseconds before driving the drive voltage $V_{DR}$ low) so that the controllable switching circuit 580 may be rendered conductive at or before the time when the triac 510 commutates off. The control circuit 530 may then drive the load current path control signal $V_{LCP}$ low to render the controllable switching circuit 580 non-conductive at the end of the half cycle (e.g., at time $t_3$ in FIG. 11).

The control circuit 530 may be configured to operate in the pulse gate drive mode or the constant gate drive mode based on various factors including, for example, user inputs or the operational state of the electrical load. The control circuit 530 may be configured to operate in one of the constant gate drive mode or the pulse gate drive mode in response to one or more user inputs received, for example, from actuations of the actuators 536 during the advanced programming mode and/or from an external programming device (such as a smart phone, a tablet, or a laptop).

The control circuit 530 may be configured to operate in the pulse gate drive mode when turning on the electrical load and in the constant gate drive mode in steady state conditions (e.g., in a similar manner as the control circuit 320 of the dimmer switch 300). The control circuit 530 may be configured to control the gate coupling circuit 550 (and thus the gate current path) using the pulse gate drive mode for a turn-on time period $T_{TURN-ON}$, before changing to the constant gate drive mode during steady state conditions. The control circuit 530 may be configured to control the drive signal $V_{DR}$ to render the gate coupling circuit 550 conductive at the firing time and thus render the triac 510 conductive (e.g., by conducting gate current $I_G$ via the gate current path and through the gate terminal of the triac). The control circuit 530 may be configured to render the gate coupling circuit 550 (and thus the gate current path) non-conductive after the pulse time period $T_{PULSE}$ from the firing time by rendering the controllable switching circuit 580 non-conductive. The control circuit 530 may adjust the length of the pulse time period $T_{PULSE}$ over one or more line cycles (or half cycles) during the turn-on time period $T_{TURN-ON}$. The one or more line cycles (or half cycles) may be consecutive. For example, during the turn-on time period $T_{TURN-ON}$, the control circuit 530 may be configured to increase the pulse time period $T_{PULSE}$ by a predetermined increment $T_{INC}$ (e.g., approximately 20 μsec) during consecutive line cycles from a minimum pulse time period $T_{PULSE-MIN}$ (e.g., approximately 100 μsec) to a maximum pulse time period $T_{PULSE-MAX}$ (which may range, for example, from approximately 0.5 msec at low-end to approximately 5.5 msec at high-end). The length of the turn-on time period $T_{TURN-ON}$ may be dependent upon a target intensity $L_{TRGT}$ and may range, for example, from approximately 20 line cycles (at low-end) to approximately 270 line cycles (at high-end). The maximum pulse time period $T_{PULSE-MAX}$ may be equal to the length of the time period during which the gate current path remains conductive in a constant gate drive mode half cycle. The length of the time period may be dependent upon what is required to drive the triac 510 using the constant gate drive mode to achieve a target intensity $L_{TRGT}$ of the light source (e.g., dependent upon a present firing time of the constant gate drive mode). The maximum pulse time period $T_{PULSE-MAX}$ may thus be dependent upon the target intensity $L_{TRGT}$ to which the control circuit 530 is turning on the LED light source 104. Accordingly, at the end of the turn-on time period $T_{TURN-ON}$, the control circuit 530 may smoothly transition into the constant gate drive mode to achieve the target intensity $L_{TRGT}$.

The control circuit 530 may maintain the pulse time period $T_{PULSE}$ constant during the turn-on time period $T_{TURN-ON}$. In such cases, the control circuit 530 may adjust the pulse time period $T_{PULSE}$ at the end of the turn-on time period $T_{TURN-ON}$ (and/or the beginning of the constant gate drive mode), so that the pulse time period $T_{PULSE}$ may be approximately equal to the gate pulse time period required to drive the triac 510 to achieve the target intensity $L_{TRGT}$ using the constant gate drive mode.

The control circuit 530 may be configured to perform at least a subset of the procedure illustrated by and described in association with FIG. 8.

The control circuit 530 may be configured to first attempt to turn on the LED light source 104 using the constant gate drive mode, detect a fault condition (e.g., that the control circuit 530 reset), and subsequently attempt to turn on the LED light source 104 using the pulse gate drive mode in response to detecting the fault condition. If the control circuit 530 is able to turn on the LED light source 104 using the constant gate drive mode or the pulse gate drive mode without detecting fault conditions, the control circuit may be configured to store an indication of the suitable gate drive mode in memory for turning on the LED light source 104, such that the control circuit may use that gate drive mode whenever the control circuit is attempting to turn on the LED light source 104. If the control circuit 530 is not able to turn on the LED light source 104 using either of the constant gate drive mode and the pulse gate drive mode, the control circuit 530 may attempt to turn on the LED light source using another mode of operation. More generally, the control circuit 530 may turn on the light source by performing a procedure similar to that illustrated in and described in association with FIG. 9.

If the dimmer switch 500 has a neutral terminal and the control circuit 530 determines that the neutral terminal is connected to the neutral side of the AC power source 105, the control circuit may be configured to operate in the pulse gate drive mode in multiple situations (e.g., including at all times). If the control circuit 530 determines that the neutral terminal is not connected to the neutral side of the AC power source 105, the control circuit may be configured to operate in the constant gate drive mode both when turning on the electrical load and when in the steady state condition (e.g., including at all times), or to operate in the pulse gate drive mode when turning on the LED light source 104 and then operating in the constant gate drive mode when in the steady state condition.

What is claimed is:

1. A load control device for controlling power delivered from an AC power source to an electrical load, the load control device comprising:
   a thyristor adapted to be electrically coupled between the AC power source and the electrical load, the thyristor comprising first and second main terminals through which current can be conducted to energize the electrical load and a gate terminal through which current can be conducted to render the thyristor conductive; and
   a control circuit electrically coupled to cause a pulse of current to be conducted through the gate terminal of the thyristor at a firing time during a half-cycle of the AC power source to render the thyristor conductive, the control circuit configured to turn on the electrical load using one of a plurality of start-up routines;
   wherein, when using a first start-up routine of the plurality of start-up routines, the control circuit is configured to cause a single pulse of current to be conducted through the gate terminal of the thyristor during the half-cycle of the AC power source to attempt to render the thyristor conductive;
   wherein, when using a second start-up routine of the plurality of start-up routines, the control circuit is configured to cause a pulse of current to be conducted through the gate terminal of the thyristor during the half-cycle of the AC power source to attempt to render the thyristor conductive, the control circuit further configured to conduct at least one other pulse of current through the gate terminal of the thyristor after the firing time during the half-cycle of the AC power source, and
   wherein the control circuit is configured to perform one of the first or second start-up routines to turn on the electrical load, detect a condition while turning on the electrical load using the one of the first or second start-up routines, and switch to the other one of the first or second start-up routines to turn on the electrical load.

2. The load control device of claim 1, further comprising:
   a gate current path connected to the gate terminal of the thyristor, the gate current path comprising a gate coupling circuit and configured to conduct current through the gate terminal of the thyristor;
   wherein the control circuit is configured to control the gate current path to conduct the pulse of the current through the gate terminal of the thyristor to render the thyristor conductive at the firing time during the half-cycle of the AC power source.

3. The load control device of claim 2, wherein the gate current path further comprises a controllable switching circuit configured to be electrically coupled in series between the gate coupling circuit and the gate terminal of the thyristor and to conduct current through the gate terminal of the thyristor, and wherein the control circuit is configured to render the controllable switching circuit conductive and to control the gate coupling circuit to conduct the pulse of current through the gate terminal of the thyristor at the firing time to render the thyristor conductive.

4. The load control device of claim 3, wherein, when using the second start-up routine, the control circuit is configured to render the controllable switching circuit non-conductive before the end of the half-cycle of the AC power source to prevent further pulses of current from being conducted through the gate terminal of the thyristor.

5. The load control device of claim 4, wherein the thyristor is capable of commutating off after the control circuit renders the controllable switching circuit non-conductive, the control circuit being further configured to maintain the controllable switching circuit non-conductive until at least the beginning of a subsequent half-cycle of the AC power source.

6. The load control device of claim 3, wherein at least one of the plurality of start-up routines comprises rendering the controllable switching circuit non-conductive during the half-cycle of the AC power source before rendering the gate coupling circuit non-conductive during the half-cycle of the AC power source.

7. The load control device of claim 3, wherein at least one of the plurality of start-up routines comprises rendering the controllable switching circuit and the gate coupling circuit non-conductive at the same time during the half-cycle of the AC power source.

8. The load control device of claim 2, wherein, when using the first start-up routine, the control circuit is configured to render the gate current path conductive for a pulse time period and render the gate current path non-conductive after the pulse time period during the half-cycle of the AC power source.

9. The load control device of claim 2, wherein, when using the second start-up routine, the control circuit is configured to maintain the gate current path conductive after the pulse time period to allow the at least one other pulse of current to be conducted through the gate terminal of the thyristor after the pulse time period during the half-cycle of the AC power source.

10. The load control device of claim 1, wherein, when operating in a constant gate drive mode, the control circuit is configured to render the gate current path non-conductive before the end of the half-cycle of the AC power source to prevent further pulses of current from being conducted through the gate terminal of the thyristor.

11. The load control device of claim 10, further comprising:
a controllable switching circuit configured to be electrically coupled in parallel with the first and second main terminals of the thyristor;
wherein the thyristor is capable of commutating off after the control circuit renders the gate coupling circuit non-conductive, the control circuit further configured to render the controllable switching circuit conductive after rendering the gate coupling circuit non-conductive and maintain the controllable switching circuit conductive until the end of the half-cycle to conduct the load current through the electrical load after the thyristor commutates off.

12. The load control device of claim 1, further comprising:
a zero-crossing detection circuit configured to generate a zero-cross signal that provides an indication of a zero-crossing of the AC power source;

wherein the control circuit is configured to control the gate current path to conduct the pulse of current through the gate terminal of the thyristor to render the thyristor conductive at the firing time during the half-cycle of the AC power source based on the zero-cross signal.

13. The load control device of claim 12, wherein the control circuit is configured to sample the zero-cross signal during a zero-cross window and determine if the zero-cross signal indicated the zero-crossing of the AC power source during the zero-cross window.

14. The load control device of claim 13, wherein the control circuit further configured to operate in the constant gate drive mode while turning on the electrical load and detect the condition by determining that the zero-cross signal did not indicate the zero-crossing of the AC power source during the zero-cross window while turning on the electrical load using the constant gate drive mode, the control circuit configured to subsequently operate in a different gate drive mode while turning on the electrical load.

15. The load control device of claim 1, wherein the condition comprises a fault condition, and the control circuit is configured to detect the fault condition in response to detecting that the control circuit has reset.

16. The load control device of claim 15, further comprising
a zero-crossing detection circuit configured to generate a zero-cross signal that provides indications of zero-crossings of the AC power source;
wherein the control circuit is configured to reset after not detecting zero-crossings of the AC power source for a predetermined number of half-cycles.

17. A load control device for controlling power delivered from an AC power source to an electrical load, the load control device comprising:
a thyristor adapted to be electrically coupled between the AC power source and the electrical load, the thyristor comprising first and second main terminals through which current can be conducted to energize the electrical load and a gate terminal through which current can be conducted to render the thyristor conductive; and
a control circuit electrically coupled to cause a pulse of current to be conducted through the gate terminal of the thyristor at a firing time during a half-cycle of the AC power source to render the thyristor conductive, the control circuit configured to turn on the electrical load using one of a plurality of start-up routines,
wherein, when using a first start-up routine of the plurality of start-up routines, the control circuit is configured to cause a single pulse of current to be conducted through the gate terminal of the thyristor during the half-cycle of the AC power source to attempt to render the thyristor conductive;
wherein, when using a second start-up routine of the plurality of start-up routines, the control circuit is configured to cause a pulse of current to be conducted through the gate terminal of the thyristor during the half-cycle of the AC power source to attempt to render the thyristor conductive, the control circuit further configured to conduct at least one other pulse of current through the gate terminal of the thyristor after the firing time during the half-cycle of the AC power source, and
wherein the control circuit is configured to perform the second start-up routine to turn on the electrical load, detect a fault condition while turning on the electrical load using the second start-up routine, and switch to the first start-up routine to turn on the electrical load.

18. The load control device of claim 17, further comprising:
  a zero-crossing detection circuit configured to generate a zero-cross signal that provides an indication of a zero-crossing of the AC power source;
  wherein the control circuit is configured to control the gate current path to conduct the pulse of current through the gate terminal of the thyristor to render the thyristor conductive at the firing time during the half-cycle of the AC power source based on the zero-cross signal.

19. The load control device of claim 18, wherein the control circuit is further configured to:
  sample the zero-cross signal during a zero-cross window;
  determine if the zero-cross signal indicated the zero-crossing of the AC power source during the zero-cross window;
  detect the fault condition by determining that the zero-cross signal did not indicate the zero-crossing of the AC power source during the zero-cross window while turning on the electrical load using a constant gate drive mode; and
  subsequently operate in a different gate drive mode while turning on the electrical load.

20. A load control device for controlling power delivered from an AC power source to an electrical load, the load control device comprising:
  a thyristor adapted to be electrically coupled between the AC power source and the electrical load, the thyristor comprising first and second main terminals through which current can be conducted to energize the electrical load and a gate terminal through which current can be conducted to render the thyristor conductive; and
  a control circuit electrically coupled to cause a pulse of current to be conducted through the gate terminal of the thyristor at a firing time during a half-cycle of the AC power source to render the thyristor conductive, the control circuit configured to turn on the electrical load using one of a plurality of start-up routines,
  wherein, when using a first start-up routine of the plurality of start-up routines, the control circuit is configured to cause a single pulse of current to be conducted through the gate terminal of the thyristor during the half-cycle of the AC power source to attempt to render the thyristor conductive;
  wherein, when using a second start-up routine of the plurality of start-up routines, the control circuit is configured to cause a pulse of current to be conducted through the gate terminal of the thyristor during the half-cycle of the AC power source to attempt to render the thyristor conductive, the control circuit further configured to conduct at least one other pulse of current through the gate terminal of the thyristor after the firing time during the half-cycle of the AC power source, and
  wherein the control circuit is configured to perform the first start-up routine to turn on the electrical load, detect a fault condition while turning on the electrical load using the first start-up routine, and switch to the second start-up routine to turn on the electrical load.

* * * * *